US012634673B2

(12) United States Patent
Yun et al.

(10) Patent No.: US 12,634,673 B2
(45) Date of Patent: May 19, 2026

(54) ELECTRONIC DEVICE FOR MANAGING CONTROLLED DEVICE AND METHOD OF OPERATING SAME

(71) Applicant: Samsung Electronics Co., Ltd., Suwon-si (KR)

(72) Inventors: Jeonghyeon Yun, Suwon-si (KR); Hyunjoong Kim, Suwon-si (KR); Kyeongjun Kim, Suwon-si (KR); Jonghwan Kim, Suwon-si (KR); Moohyun Shin, Suwon-si (KR); Chaeyoung Yun, Suwon-si (KR); Kanghee Lee, Suwon-si (KR); Gyubeom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 18/356,456

(22) Filed: Jul. 21, 2023

(65) Prior Publication Data

US 2024/0056787 A1      Feb. 15, 2024

Related U.S. Application Data

(63) Continuation of application No. PCT/KR2023/006702, filed on May 17, 2023.

(30) Foreign Application Priority Data

Aug. 10, 2022      (KR) ........................ 10-2022-0099972

(51) Int. Cl.
*H04W 76/10*      (2018.01)
*H04W 8/00*      (2009.01)

(52) U.S. Cl.
CPC ........... *H04W 8/005* (2013.01); *H04W 76/10* (2018.02)

(58) Field of Classification Search
None
See application file for complete search history.

(56)      References Cited

U.S. PATENT DOCUMENTS 9,773,408 B2      9/2017   Kim et al.
11,284,258 B1 *   3/2022   Wei ......................... H04L 63/10
(Continued)

FOREIGN PATENT DOCUMENTS

JP      2021-145247 A      9/2021
KR      10-2014-0089878 A   7/2014
(Continued)

OTHER PUBLICATIONS

International Search Report dated Aug. 28, 2023, issued in International Application No. PCT/KR2023/006702.

*Primary Examiner* — Kodzovi Acolatse
(74) *Attorney, Agent, or Firm* — Jefferson IP Law, LLP

(57)      ABSTRACT

An electronic device is provided. The electronic device includes a communication module and at least one processor. The at least one processor may be configured to acquire identification information of a controlled device by performing a nearby device scan, request confirm data of the controlled device corresponding to the identification information from the server, perform a first registration procedure including operations for registering the controlled device in the server in case that the confirm data is not received from the server, and perform a second registration procedure including the remaining operations except for at least one operation for obtaining the confirm data from among operations included in the first registration procedure in case that the confirm data is received from the server.

9 Claims, 25 Drawing Sheets

(56)  References Cited

U.S. PATENT DOCUMENTS

| | | |
|---|---|---|
| 2015/0317467 A1 | 11/2015 | Rattner et al. |
| 2017/0134503 A1* | 5/2017 | Cho ..................... G07C 5/008 |
| 2017/0195318 A1 | 7/2017 | Liu et al. |
| 2019/0296932 A1 | 9/2019 | Jang et al. |
| 2019/0296979 A1* | 9/2019 | Gupta .................... H04L 41/16 |
| 2019/0306673 A1 | 10/2019 | Sharaga et al. |
| 2019/0357023 A1 | 11/2019 | Park |
| 2020/0053399 A1* | 2/2020 | Choi ................. H04N 21/4108 |
| 2021/0297978 A1* | 9/2021 | Lee ...................... H04W 60/00 |
| 2022/0330020 A1* | 10/2022 | Khandani .............. H04L 67/55 |
| 2023/0018433 A1* | 1/2023 | Shenoy ................ H04W 12/55 |
| 2023/0214852 A1* | 7/2023 | Andreas ............ G06K 19/0723 |
| | | 705/318 |
| 2023/0353555 A1 | 11/2023 | Kim et al. |
| 2024/0224045 A1* | 7/2024 | Mariyani ................ H04W 8/02 |

FOREIGN PATENT DOCUMENTS

| | | | |
|---|---|---|---|
| KR | 10-2016-0050963 A | 5/2016 | |
| KR | 10-1789264 B1 | 10/2017 | |
| KR | 10-2019-0001138 A | 1/2019 | |
| KR | 10-2019-0055483 A | 5/2019 | |
| KR | 10-2019-0119206 A | 10/2019 | |
| KR | 10-2019-0134922 A | 12/2019 | |
| KR | 10-2020-0086829 A | 7/2020 | |
| KR | 10-2022-0102469 A | 7/2022 | |
| WO | 2017/106224 A1 | 6/2017 | |
| WO | 2018/190219 A1 | 10/2018 | |
| WO | WO-2020013639 A1 * | 1/2020 | ............ G06F 21/30 |
| WO | 2021/091435 A1 | 5/2021 | |

\* cited by examiner

Figure 6:
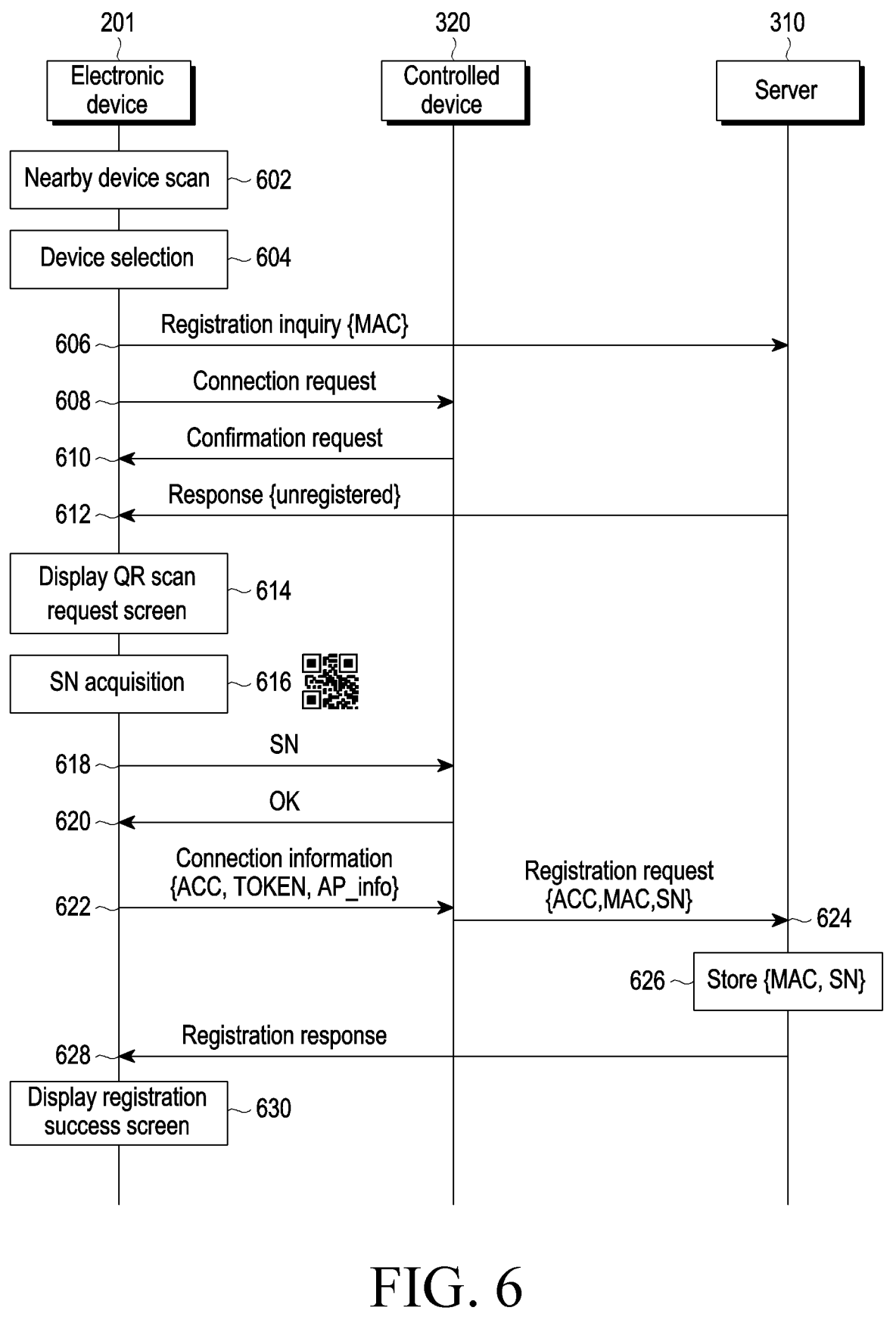

201

| Electronic device |

320

| Controlled device |

310

| Server |

| Nearby device scan | ~ 602

| Device selection | ~ 604

606 ~ Registration inquiry {MAC}

608 ~ Connection request

610 ~ Confirmation request

612 ~ Response {unregistered}

| Display QR scan request screen | ~ 614

| SN acquisition | ~ 616

618 ~ SN

620 ~ OK

622 ~ Connection information {ACC, TOKEN, AP_info}

Registration request {ACC,MAC,SN} ~ 624

626 ~ | Store {MAC, SN} |

628 ~ Registration response

| Display registration success screen | ~ 630

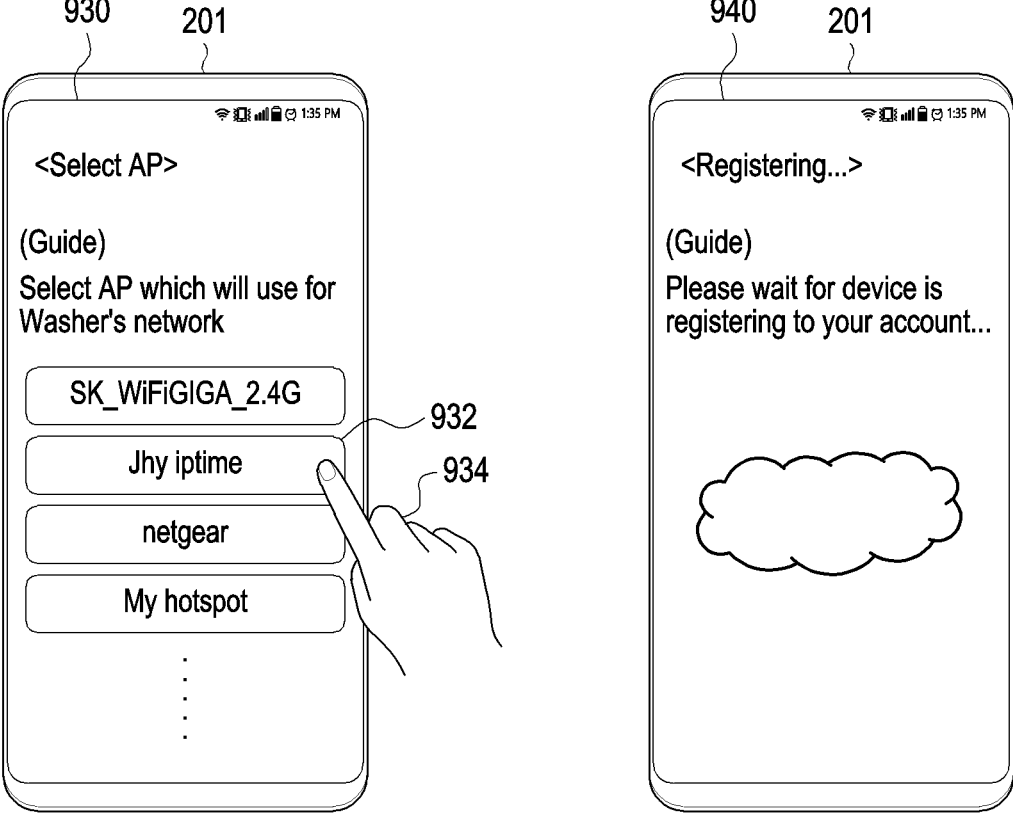
FIG. 9C                    FIG. 9D 950    201

1160 201

1170 201

1210

ELECTRONIC DEVICE FOR MANAGING CONTROLLED DEVICE AND METHOD OF OPERATING SAME

CROSS-REFERENCE TO RELATED APPLICATION(S)

This application is a continuation application, claiming priority under § 365(c), of an International application No. PCT/KR2023/006702, filed on May 17, 2023, which is based on and claims the benefit of a Korean patent application number 10-2022-0099972, filed on Aug. 10, 2022, in the Korean Intellectual Property Office, the disclosure of which is incorporated by reference herein in its entirety.

TECHNICAL FIELD

The disclosure relates to an electronic device for managing a controlled device and a method for operating the same.

BACKGROUND ART

Various services and additional functions provided through an electronic device such as a user terminal, for example, a smartphone, are gradually increasing. In order to increase the utility value of such an electronic device and satisfy various needs of users, communication service providers or electronic device manufacturers are developing electronic devices providing various functions. Accordingly, various functions provided through electronic devices are also being advanced.

As wireless communication technology develops, devices using artificial intelligence (AI) are being widely introduced. For example, home appliances that are connected to a network by applying Internet of things (IoT) technology may use artificial intelligence. IoT technology may provide intelligent Internet technology services by collecting and analyzing data generated by devices. Through convergence and combination of Internet technology and various industries, IoT technology can be applied to fields such as smart homes, smart buildings, smart cities, smart cars, and smart appliances.

On the other hand, a home is equipped with various home appliances for the convenience of users. Various services have been proposed to more conveniently operate or control home appliances by using IoT technology. Home network technology may provide various services to users in home through a home network. For example, a user may control various controlled devices (e.g., home appliances to which IoT technology is applied) configuring a home network by using a personal electronic device (e.g., a smartphone).

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Solution

Aspects of the disclosure are to address at least the above-mentioned problems and/or disadvantages and to provide at least the advantages described below. Accordingly, an aspect of the disclosure is to provide an electronic device capable of registering or re-registering a controlled device in a server and a method for operating the same.

An aspect of the disclosure is to provide an electronic device capable of simplifying registration or re-registration of a controlled device by using registration information of a controlled device stored in a server, and a method for operating the same.

An aspect of the disclosure is to provide an electronic device in which a pre-registered controlled device provides spatial information and connection information that can be used in a registration procedure to an unregistered controlled device, and a method for operating the same.

Additional aspects will be set forth in part in the description which follows and, in part, will be apparent from the description, or may be learned by practice of the presented embodiments.

In accordance with an aspect of the disclosure, an electronic device is provided. The electronic device may include a communication module and at least one processor operatively connected to the communication module. The at least one processor may be configured to acquire identification information of a controlled device by performing a nearby scan. The at least one processor may be configured to request confirm data of the controlled device corresponding to the identification information from the server through the communication module. The at least one processor may be configured to perform a first registration procedure including operations for registering the controlled device in the server through the communication module in case that the confirm data is not received from the server. The at least one processor may be configured to perform a second registration procedure including the remaining operations except for at least one operation for obtaining the confirm data from among operations included in the first registration procedure in case that the confirm data is received from the server.

In accordance with an aspect of the disclosure, a method for operating an electronic device is provided. The method may include acquiring identification information of the controlled device by performing a nearby scan. The method may include requesting confirm data of the controlled device corresponding to the identification information from the server. The method may include performing a first registration procedure including operations for registering the controlled device in the server in case that the confirm data is not received from the server. The method may include performing a second registration procedure including the remaining operations except for at least one operation for obtaining the confirm data from among operations included in the first registration procedure in case that the confirm data is received from the server.

In accordance with an aspect of the disclosure, a non-transitory computer-readable storage medium for storing one or more programs is provided, wherein the one or more programs store instructions that when executed by at least one processor of an electronic device cause the electronic device to execute the instructions configured to acquire identification information of a controlled device by performing a nearby scan, request confirm data of the controlled device corresponding to the identification information from the server, perform a first registration procedure including operations for registering the controlled device in the server in case that the confirm data is not received from the server, and perform a second registration procedure including the remaining operations except for at least one operation for obtaining the confirm data from among operations included in the first registration procedure in case that the confirm data is received from the server.

In accordance with an aspect of the disclosure, an electronic device is provided. The electronic device may include a communication interface, and a processor operatively connected to the communication interface. The processor may be configured to perform registration in a server through the communication interface. The processor may be configured to obtain at least one of a partial serial number or device type information of an unregistered device from a signal broadcast from the unregistered device through a nearby device scan. The processor may be configured to obtain a full serial number of the unregistered device from the server based on at least one of the partial serial number or device type information. The processor may be configured to transmit connection information used for the unregistered device to connect to the server, and spatial information of the electronic device to the unregistered device.

In accordance with another aspect of the disclosure, a method for operating an electronic device is provided. The method may include performing registration in a server through the communication interface. The method may include obtaining at least one of a partial serial number or device type information of the unregistered device from a signal broadcast from the unregistered device through a nearby device scan. The method may include obtaining a full serial number of the unregistered device from the server based on at least one of the partial serial number or device type information. The method may include transmitting connection information used for the unregistered device to connect to the server, and spatial information of the electronic device to the unregistered device.

In accordance with an aspect of the disclosure, a non-transitory computer-readable storage medium for storing one or more programs is provided, wherein the one or more programs store instructions that when executed by at least one processor of an electronic device cause the electronic device to execute the instructions configured to perform registration in a server, obtain at least one of a partial serial number or device type information of the unregistered device from a signal broadcast from the unregistered device through a nearby device scan, obtain a full serial number of the unregistered device from the server based on at least one of the partial serial number or device type information, and transmit connection information used for the unregistered device to connect to the server, and spatial information of the electronic device to the unregistered device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 6 is a signal flow diagram illustrating an example of a procedure of initially registering a controlled device according to an embodiment of the disclosure;

FIGS. 9A, 9B, 9C, 9D, and 9E illustrate examples of a user interface illustrating a procedure of re-registering a controlled device in a server according to various embodiments of the disclosure;

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
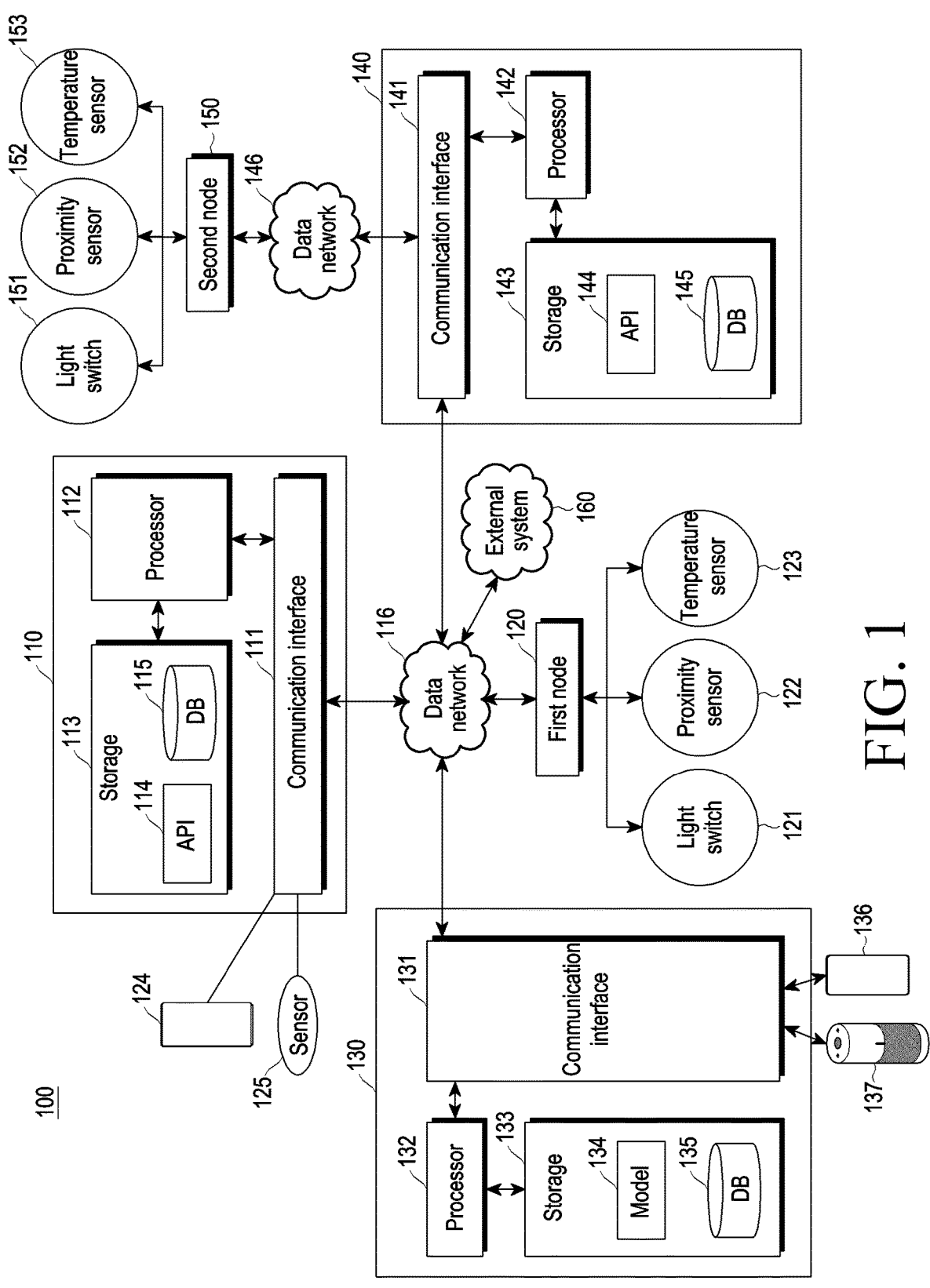
FIG. 1 illustrates an Internet of things (IoT) system according to an embodiment of the disclosure.

FIG. 1 illustrates an Internet of things (IoT) system 100 according to an embodiment of the disclosure. Meanwhile, the system may be implemented such that at least some of the elements of FIG. 1 are omitted and elements that are not shown are further included therein.

Referring to FIG. 1, an IoT system 100 according to an embodiment includes a plurality of electronic devices connectable to a data network 116 or 146. For example, the IoT system 100 may include a first IoT server 110, a first node 120, a voice assistant server 130, a second IoT server 140, a second node.150, or at least one of devices 121, 122, 123, 124, 125, 136, 137, 151, 152, and 153.

According to an embodiment, the first IoT server 110 may include at least one of a communication interface 111, a processor 112, or a storage 113. The second IoT server 140 may include at least one of a communication interface 141, a processor 142, or a storage 143. "IoT server" in this document may remotely control and/or monitor one or more devices (e.g., the devices 121, 122, 123, 124, 125, 151, 152, and 153) through a relay device (e.g., the first node 120 or the second node 150) or directly without the relay device, based on a data network (e.g., a data network 116 or a data network 146) for example. A "device" herein may be a sensor, a home appliance, an office electronic device, or a device for performing a process, which are placed (or located) within a local environment, such as, for example, a home, office, factory, building, off-site location, or other type of premises, but there is no limitation to the type thereof. A device configured to receive a control command and perform an operation corresponding to the control command may be referred to as a "target device". The IoT server may be referred to as a central server with regard to selecting a target device from among a plurality of devices and providing a control command thereto.

According to an embodiment, the first IoT server 110 may communicate with the devices 121, 122, and 123 through the data network 116. The data network 116 may imply a network for long-distance communication, such as, for example, the Internet or a computer network (e.g., LAN or WAN), or may include a cellular network.

According to an embodiment, the first IoT server 110 may be connected to the data network 116 through the communication interface 111. The communication interface 111 may include a communication device (or a communication module) for supporting communication of the data network 116, may be integrated into one element (e.g., a single chip), or may be implemented with a plurality of separate elements (e.g., a plurality of chips). The first IoT server 110 may communicate with the devices 121, 122, and 123 through the first node 120. The first node 120 may receive data from the first IoT server 110 through the data network 116 and transmit the received data to at least some of the devices 121, 122, and 123. Alternatively, the first node 120 may receive data from at least some of the devices 121, 122, and 123, and transmit the received data to the first IoT server 110 through the data network 116. The first node 120 may function as a bridge between the data network 116 and the devices 121, 122, and 123. Meanwhile, in FIG. 1, the first node 120 is illustrated as being one, but this is simply exemplary, and the number thereof is not limited thereto.

A "node" in this document may be an edge computing system or a hub device. According to an embodiment, the first node 120 may support wired and/or wireless communication of the data network 116, and may also support wired and/or wireless communication with the devices 121, 122, and 123. For example, the first node 120 may be connected to the devices 121, 122, and 123 through a short-range communication network such as at least one of Bluetooth, Wi-Fi, Wi-Fi direct, Z-wave, Zig-bee, INSETEON, X10, and infrared data association (IrDA), but there is no limitation to the type of communication. The first node 120 may be placed (or located) in an environment, such as a house, office, factory, building, off-site location, or other type of premises. Accordingly, the devices 121, 122, and 123 may be monitored and/or controlled by the service provided by the first IoT server 110, and the devices 121, 122, and 123 may not be required to have the full capability of network communication (e.g., Internet communication) for direct connection to the IoT server 110. The devices 121, 122, and 123 are illustrated as being implemented as electronic devices in a home environment, such as, for example, a light switch, a proximity sensor, or a temperature sensor, this is exemplary and not limited thereto.

According to an embodiment, the first IoT server 110 may support direct communication with the devices 124 and 125. Here, "direct communication" implies communication performed without going through a relay device such as the first node 120, and may refer to, for example, communication through a cellular communication network and/or a data network.

According to an embodiment, the first IoT server 110 may transmit a control command to at least some of the devices 121, 122, 123, 124, and 125. Here, "control command" may refer to data causing a controllable device to perform a specific operation, and the specific operation is an operation performed by a device and may include information output, information sensing, information reporting, and information management (e.g., deletion or generation), and there are no restrictions on the type thereof. For example, the processor 112 may be configured to acquire information (or, a request) for generating a control command from the outside (e.g., the voice assistant server 130, the second IoT server 140, the external system 160, or at least some of the devices 121, 122, 123, 124, and 125), and may generate a control command based on the acquired information. Alternatively, the processor 112 may be configured to generate a control command based on whether a result of monitoring at least some of the devices 121, 122, 123, 124, and 125 satisfy a designated condition. The processor 112 may be configured to control the communication interface 111 to transmit the control command to a target device.

According to an embodiment, the processor 112, the processor 132, or the processor 142 may be implemented as a combination of one or more of a general-purpose processor such as a central processing unit (CPU), a digital signal processor (DSP), an application processor (AP), and a communication processor (CP), a graphics-only processor such as a graphical processing unit (GPU) or a vision processing unit (VPU), or an artificial intelligence-only processor such as a neural processing unit (NPU). Those skilled in the art will understand that the above processing unit is merely described as an example, and that there is no limitation in the processor as long as the processor 112 is, for example, an arithmetic measures capable of executing instructions stored in the memory 113 and outputting a result of execution.

According to an embodiment, the processor 112 may configure a web-based interface based on the API 114 or may expose a resource, which is managed by the first IoT server 110, to the outside. The web-based interface may support communication between the first IoT server 110 and an external web service, for example. The processor 112 may be configured to allow the external system 160 to control and/or access the devices 121, 122, and 123, for example. The external system 160 may be, for example, an independent system that is not associated with, or is not part of, the system 100. The external system 160 may be, for example, an external server or a web site. However, security is required for access from the external system 160 to resources of the first IoT server 110 or the devices 121, 122, and 123. According to an embodiment, the processor 112 may expose, by using an automation application, an API endpoint (e.g., a universal resource locator (URL)) based on the API 114 to the outside. As described above, the first IoT server 110 may transmit a control command to a target device from among the devices 121, 122, and 123. Meanwhile, descriptions of the communication interface 141, the processor 142, and the API 144 and the database 145 of the storage 143 of the second IoT server 140 may be substantially the same as the descriptions of the communication interface 111, the processor 112, and the API 114 and the database 115 of the storage 113 of the first IoT server 110. In addition, a description of the second node 150 may be substantially the same as that of the first node 120. The second IoT server 140 may transmit a control command to a target device among the devices 151, 152, and 153. The first IoT server 110 and the second IoT server 140 may be operated by the same service provider in an embodiment, but may be operated by different service providers in other embodiments.

According to an embodiment, the voice assistant server 130 may transmit/receive data to/from the first IoT server 110 through the data network 116. The voice assistant server 130 according to an embodiment may include at least one of a communication interface 131, a processor 132, and a storage 133. The communication interface 131 may communicate with a smartphone 136 or AI speaker 137 through a data network (not shown) and/or a cellular network (not shown). The smartphone 136 or AI speaker 137 may include a microphone, and may acquire a user voice, convert the acquired user voice into a voice signal, and transmit the voice signal to the voice assistant server 130. The processor 132 may receive a voice signal from the smartphone 136 or AI speaker 137 through the communication interface 131. The processor 132 may process the received voice signal based on a stored model 134. The processor 132 may generate (or identify) a control command, using a result of processing, based on information stored in a database 135. According to an embodiment, the storage 113, 133, 143 may include at least one type of non-transitory storage medium from among a flash memory type, a hard disk type, a multimedia card micro type, or a card type memory (e.g., secure digital (SD) or extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, and an optical disk, and there is no limitation on the type thereof.

At least one device (e.g., the device 124) communicating with the first IoT server 110 may be a smartphone (the electronic device 201 of FIG. 2 as an example) within a network environment.

Figure 2:
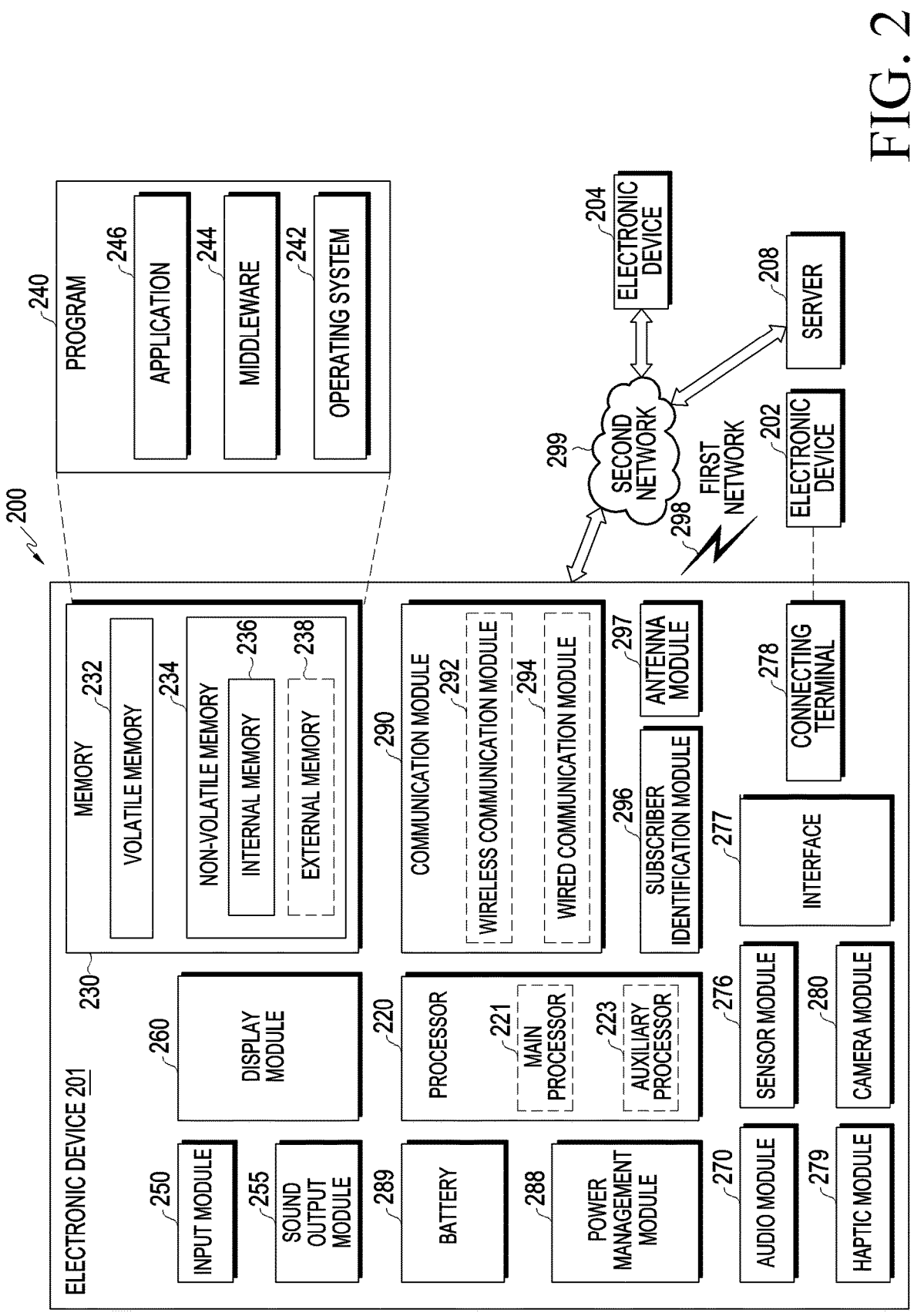
FIG. 2 is a block diagram of an electronic device in a network environment according to an embodiment of the disclosure.

FIG. 2 is a block diagram illustrating an electronic device 201 in a network environment 200 according to an embodiment of the disclosure.

Referring to FIG. 2, the electronic device 201 in the network environment 200 may communicate with an electronic device 202 via a first network 298 (e.g., a short-range wireless communication network), or at least one of an electronic device 204 or a server 208 via a second network 299 (e.g., a long-range wireless communication network). According to an embodiment, the electronic device 201 may communicate with the electronic device 204 via the server 208. According to an embodiment, the electronic device 201 may include a processor 220, memory 230, an input module 250, a sound output module 255, a display module 260, an audio module 270, a sensor module 276, an interface 277, a connecting terminal 278, a haptic module 279, a camera module 280, a power management module 288, a battery 289, a communication module 290, a subscriber identification module (SIM) 296, or an antenna module 297. In some embodiments, at least one of the components (e.g., the connecting terminal 278) may be omitted from the electronic device 201, or one or more other components may be added in the electronic device. In some embodiments, some of the components (e.g., the sensor module 276, the camera module 280, or the antenna module 297) may be implemented as a single component (e.g., the display module 260).

The processor 220 may execute, for example, software (e.g., a program 240) to control at least one other component (e.g., a hardware or software component) of the electronic device 201 coupled with the processor 220, and may perform various data processing or computation. According to one embodiment, as at least part of the data processing or computation, the processor 220 may store a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), or an auxiliary processor 223 (e.g., a graphics processing unit (GPU), a neural processing unit (NPU), an image signal processor (ISP), a sensor hub processor, or a communication processor (CP)) that is operable independently from, or in conjunction with, the main processor 221. For example, when the electronic device 201 includes the main processor 221 and the auxiliary processor 223, the auxiliary processor 223 may be adapted to consume less power than the main processor 221, or to be specific to a specified function. The auxiliary processor 223 may be implemented as separate from, or as part of the main processor.

The auxiliary processor 223 may control at least some of functions or states related to at least one component (e.g., the display module 260, the sensor module 276, or the communication module 290) among the components of the electronic device 201, instead of the main processor 221 while the main processor 221 is in an inactive (e.g., sleep) state, or together with the main processor 221 while the main processor 221 is in an active state (e.g., executing an application). According to an embodiment, the auxiliary processor 223 (e.g., an image signal processor or a communication processor) may be implemented as part of another component (e.g., the camera module 280 or the communication module 290) functionally related to the auxiliary processor 223. According to an embodiment, the auxiliary processor 223 (e.g., the neural processing unit) may include a hardware structure specified for artificial intelligence model processing. An artificial intelligence model may be generated by machine learning. Such learning may be performed, e.g., by the electronic device 201 where the artificial intelligence is performed or via a separate server (e.g., the server 208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input module 250 may receive a command or data to be used by another component (e.g., the processor 220) of the electronic device 201, from the outside (e.g., a user) of the electronic device 201. The input module 250 may include, for example, a microphone, a mouse, a keyboard, a key (e.g., a button), or a digital pen (e.g., a stylus pen).

The sound output module 255 may output sound signals to the outside of the electronic device 201. The sound output module 255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 260 may visually provide information to the outside (e.g., a user) of the electronic device 201. The display module 260 may include, for example, a display, a hologram device, or a projector and control circuitry to control a corresponding one of the display, hologram device, and projector. According to an embodiment, the display module 260 may include a touch sensor adapted to detect a touch, or a pressure sensor adapted to measure the intensity of force incurred by the touch.

The audio module 270 may convert a sound into an electrical signal and vice versa. According to an embodiment, the audio module 270 may obtain the sound via the input module 250, or output the sound via the sound output module 255 or a headphone of an external electronic device (e.g., an electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly (e.g., wiredly) or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the electronic device 202). According to an embodiment, the connecting terminal 278 may include, for example, a HDMI connector, a USB connector, an SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to one embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device via the first network 298 (e.g., a short-range communication network, such as Bluetooth™, wireless-fidelity (Wi-Fi) direct, or infrared data association (IrDA)) or the second network 299 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first network 298 or the second network 299, using subscriber information (e.g., international mobile subscriber identity (IMSI)) stored in the subscriber identification module 296.

The wireless communication module 292 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., the millimeter wave (mmWave) band) to achieve, e.g., a high data transmission rate. The wireless communication module 292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 292 may support various requirements specified in the electronic device 201, an external electronic device (e.g., the electronic device 204), or a network system (e.g., the second network 299). According to an embodiment, the wireless communication module 292 may support a peak data rate (e.g., 20 gigabits per second (Gbps) or more) for implementing eMBB, loss coverage (e.g., 164 dB (decibel) or less) for implementing mMTC, or U-plane latency (e.g., 0.5 ms or less for each of downlink (DL) and uplink (UL), or a round trip of 1 ms or less) for implementing URLLC.

The antenna module 297 may transmit or receive a signal or power to or from the outside (e.g., the external electronic device) of the electronic device. According to an embodiment, the antenna module 297 may include an antenna including a radiating element composed of a conductive material or a conductive pattern formed in or on a substrate (e.g., a printed circuit board (PCB)). According to an embodiment, the antenna module 297 may include a plurality of antennas (e.g., array antennas). In such a case, at least one antenna appropriate for a communication scheme used in the communication network, such as the first network 298 or the second network 299, may be selected, for example, by the communication module 290 (e.g., the wireless communication module) from the plurality of antennas. The signal or the power may then be transmitted or received between the communication module 290 and the external electronic device via the selected at least one antenna. According to an embodiment, another component (e.g., a radio frequency integrated circuit (RFIC)) other than the radiating element may be additionally formed as part of the antenna module 297.

According to various embodiments, the antenna module 297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. Each of the electronic devices 202 or 204 may be a device of a same type as, or a different type, from the electronic device 201. According to an embodiment, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, mobile edge computing (MEC), or client-server computing technology may be used, for example. The electronic device 201 may provide ultra low-latency services using, e.g., distributed computing or mobile edge computing. In another embodiment, the external electronic device 204 may include an internet-of-things (IoT) device. The server 208 may be an intelligent server using machine learning and/or a neural network. According to an embodiment, the external electronic device 204 or the server 208 may be included in the second network 299. The electronic device 201 may be applied to intelligent services (e.g., smart home, smart city, smart car, or healthcare) based on 5G communication technology or IoT-related technology.

Figure 3:
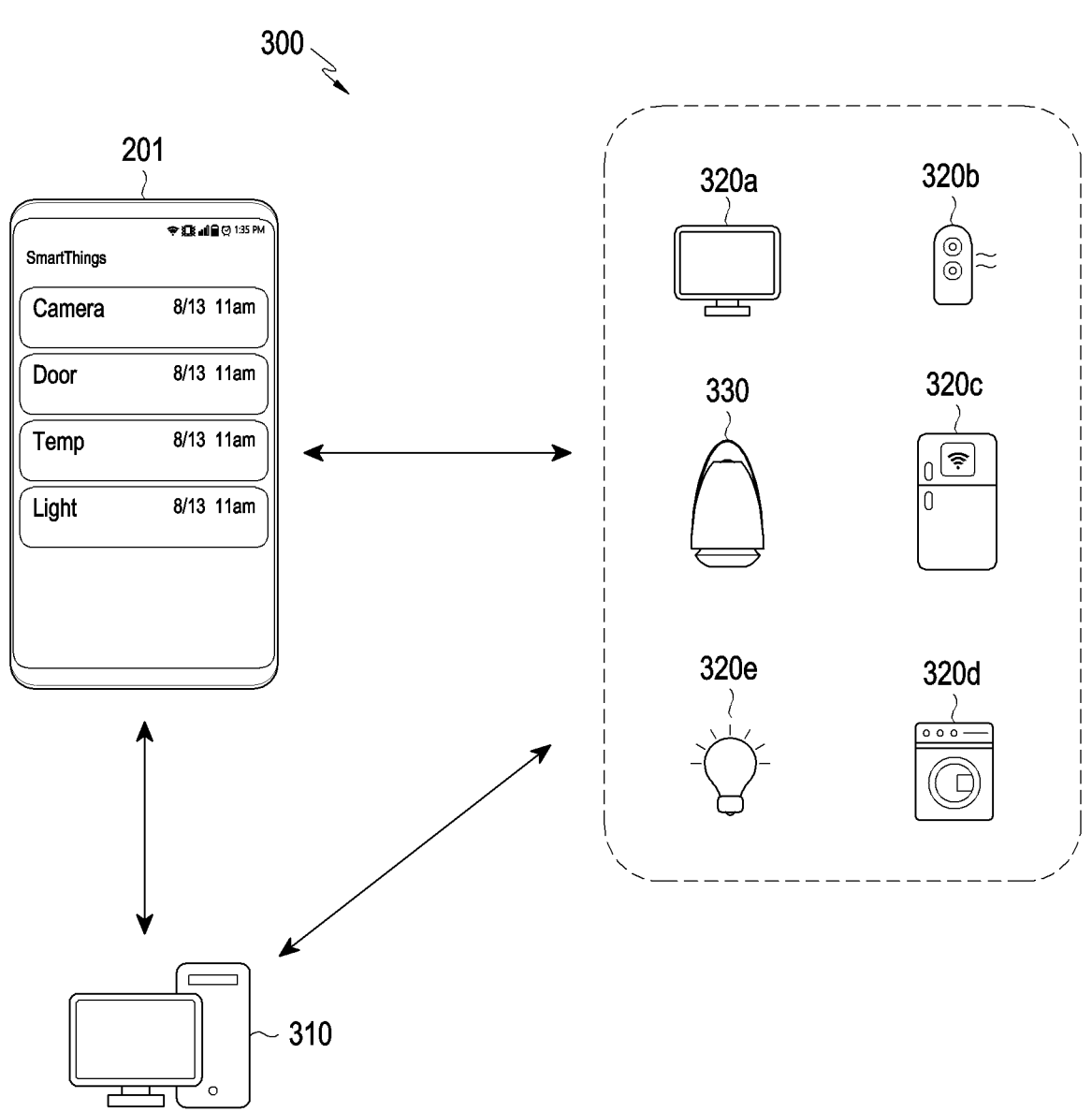
FIG. 3 illustrates a network including controlled devices according to an embodiment of the disclosure.

FIG. 3 illustrates a network including controlled devices according to an embodiment of the disclosure.

Referring to FIG. 3, a network 300 may include an electronic device 201 (e.g., a mobile terminal or user equipment) capable of communicating with a server 310 (e.g., the first IoT server 110 and/or the second IoT server 120 of FIG. 1) through network communication (e.g., the Internet) operable as IoT cloud, and one or more controlled devices 320a, 320b, 320c, 320d, 320e configured to support IoT technology and communicate with the server 310 through network communication (e.g., the Internet). A hub device 330 supporting a connection between the electronic device 201 and at least one of the controlled devices 320a, 320b, 320c, 320d, and 320e, and/or a connection between the server 310 and at least one of the controlled devices 320a, 320b, 320c, 320d, and 320e may be included in the network 300. The electronic device 201 may communicate with the controlled devices 320a, 320b, 320c, 320d, and 320e through the hub device 330, through the server 310, through long-distance wireless communication (e.g., the second network 299), or through short-range wireless communication (e.g., the first network 298).

The controlled devices 320a, 320b, 320c, 320d, and 320e may be controlled (e.g., execute a specific function) by a remote command (e.g., a control command of the electronic device 201) and, for example, may include at least one of a television, an air conditioner, a refrigerator, a washing machine, a lighting device, a security camera, a sensor, or a window treatment. The controlled devices 320a, 320b, 320c, 320d, and 320e may communicate with the electronic device 201 through the hub device 330 or communicate with the electronic device 201 through the server 310, and/or may communicate directly with the electronic device 201 (e.g., without going through the server 310 or hub device 330). The controlled devices 320a, 320b, 320c, 320d, and 320e may be configured to communicate with the electronic device 201 through long-range wireless communication (e.g., the second network 299) or using short-range wireless communication (e.g., the first network 298). In an embodiment, the controlled devices 320a, 320b, 320c, 320d, and 320e may be configured to communicate with the server 310 through long-range wireless communication (e.g., the second network 299) or using short-range wireless communication (e.g., the first network 298).

The electronic device 201 may correspond to, for example, a personal electronic device such as a smartphone, tablet, or wearable device, or an electronic device having a display and a user interface, such as a television or a control console. The electronic device 201 may discover at least one (e.g., the controlled device 320a) of the controlled devices 320a, 320b, 320c, 320d, and 320e, and may perform a registration procedure of registering the discovered controlled device 320a in the server 310. The controlled device 320a may be registered in the server 310 to be associated with a user account. The electronic device 201 may monitor and control the controlled devices 320a, 320b, 320c, 320d, and 320e registered in the server 310.

The electronic device 201 may identify the state of at least one of the controlled devices 320a, 320b, 320c, 320d, and 320e which a user will use for the IoT control service, or may control at least one of the controlled devices 320a, 320b, 320c, 320d, and 320e (e.g., transmission of a control command indicating execution of a specific function). The electronic device 201 may be an owner device included in the network 300. Although not shown, at least one member device including at least some functions and/or rights of the electronic device 201 may be included in the network 300. Although the member device may be configured not to perform a registration procedure of at least one of the controlled devices 320a, 320b, 320c, 320d, and 320e, but to perform a function of identifying or controlling the state of at least one of the controlled devices 320a, 320b, 320c, 320d, and 320e having registered in the server 310.

The hub device 330 is an electronic device configured to operate an IoT control service, and may be a server or gateway disposed in a building (home or hotel) or a remote server disposed outside the building. The hub device 330 may be a smartphone, a tablet, a personal computer (PC), or a home appliance such as a TV having a hub function. The hub device 330 may be registered in the server 310 through the electronic device 201, similarly to the controlled devices 320a, 320b, 320c, 320d, and 320e.

The user may perform a procedure of registering the controlled device 320 (e.g., a registration procedure or an onboarding procedure) in a network by using the electronic device 201 (e.g., a smartphone or wearable device) owned by the user to control the controlled device 320 (e.g., a television (TV), an air conditioner, a washing machine, a security camera, a lighting device, or a switch).

The electronic device 201 may be configured to connect the controlled device 320 to a user account by controlling the controlled device 320 to be registered in the server 310. The user may control the controlled device 320 not only at home but also in other places by using a user account. The procedure of registering the controlled device 320 in the server 310 may include a physical confirm operation of obtaining and identifying confirm data (e.g., a serial number (SN)) of the controlled device 320 to identify that the controlled device 320 is actually owned by the user. For example, the confirm data may be acquired by the electronic device by capturing verification indicia (e.g., a quick response (QR) code or bar code) or printed on or attached to the outside of the controlled device 320. The electronic device 201 may acquire confirmation of the controlled device 320 through confirm data and register the controlled device 320 in the server 310. The electronic device 201 may receive registration information corresponding to a user account from the server 310 and display controlled devices (e.g., the controlled device 320) registered for a user account, and may display the state of each controlled device or provide a control function of each controlled device for the user.

The user may install the controlled device 320, register the controlled device 320 in the server 310 by using the electronic device 201, and then re-register the controlled device 320. The electronic device 201 may be difficult to obtain confirm data of the pre-installed controlled device 320. For example, since verification indicia (e.g., a QR code or bar code) including confirm data may be attached (or printed) on the inside of a light box installed in a high place (e.g., a ceiling or high wall), the inside of a sensor box, the back of a refrigerator, or the back side of a washing machine, a user may have a difficulty to scan the verification indicia through the electronic device 201.

Therefore, in case that a user wants to re-register the controlled device 320 in the server 310 after temporarily removing the controlled device for some reason (e.g., troubleshooting) in a state where it is difficult to access the verification indicia, or in case that the connection of the controlled device 320 with respect to a user account is disconnected or the recently removed controlled device 320 is to be re-registered, or in the case of registering the controlled device 320 in the server 310 in a state where the controlled device 320 has already been registered with the user account, a procedure in which the electronic device 201 quickly and simply re-registers the controlled device may be required.

Figure 4:
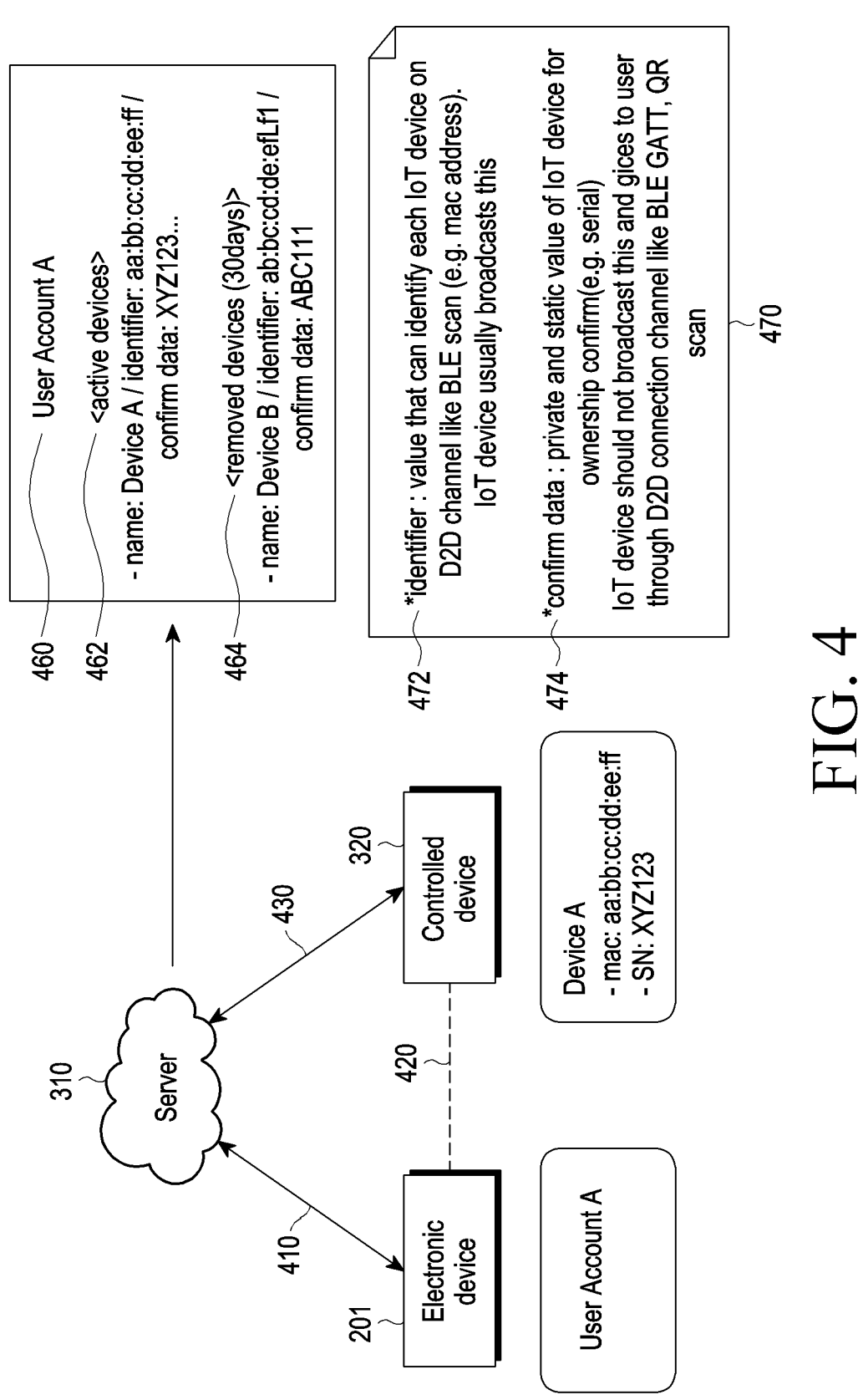
FIG. 4 illustrates registration information of a controlled device according to an embodiment of the disclosure.

FIG. 4 illustrates registration information of a controlled device according to an embodiment of the disclosure.

Referring to FIG. 4, the electronic device 201 may access and communicate with the server 310 through a first path 410 using the Internet through Wi-Fi or a cellular network, for example. The electronic device 201 may be connected to the controlled device 320 (e.g., any one of the controlled devices 320a, 320b, 320c, 320d, and 320e) through a second path 420. The second path 420 may be established based on device-to-device (D2D), Wi-Fi, or Bluetooth (e.g., Bluetooth legacy or Bluetooth low energy (BLE)).

The electronic device 201 may confirm the controlled device 320 through the second path 420 and provide the controlled device 320 with connection information used to connect a third path 430. The connection information may include AP information related to an access point (AP) used by the electronic device 201. The connection information may be provided to the electronic device 201 from the server 310 according to a request of the electronic device 201. The electronic device may connect the controlled device 320 to the server 310 through the third path 430 by using the connection information and register the controlled device 320 in the server 310. The second path 420 may be connected only during a procedure of registering the controlled device 320. When the registration procedure of the controlled device 320 with respect to the server 310 is completed, the controlled device 320 may release the second path 420. After the registration procedure is completed, the electronic device 201 may control the controlled device 320 through the server 310 by using the first path 410 and the third path 430.

The controlled device 320 may complete the registration procedure by providing registration information 470 of the controlled device 320 to the server 310 through the third path 430. The registration information 470 may include at least one of a device name (e.g., "device A") of the controlled device 320, identification information 472 that uniquely identifies the controlled device 320, or confirm data 474 of the controlled device 320.

The identification information 472 may be a value that uniquely identifies the controlled device 320 (e.g., IoT device) on a D2D channel such as a Bluetooth low energy (BLE) scan. The identification information 472 may include a media access control (MAC) address (e.g., "aa:bb:cc:dd: ee:ff") and/or a network name (e.g., a service set identifier (SSID)) of the controlled device 320. The controlled device 320 may periodically broadcast a signal (e.g., a beacon signal or an advertising signal) including its own identification information 472.

The confirm data 474 may be a private and static value for verifying ownership (e.g., physical and real possession) of the controlled device 320. The confirm data 474 may include a serial number (SN) (e.g., "XY123") of the controlled device 320. The controlled device 320 may be configured not to broadcast the confirm data 474. The controlled device 320 may include a partial serial number (partial SN) containing part of a full serial number in the advertising signal and then broadcast the same, instead of broadcasting the full serial number. The electronic device 201 may directly receive a BLE generic attribute profile (GATT) including the confirm data 474 from the controlled device 320 through a D2D connection channel, or may acquire the confirm data 474 of the controlled device 320 through scanning (or capturing) of machine-readable verification indicia (e.g., a QR code or a bar code).

The server 310 may include the registration information 470 of the controlled device 320 in an active device list 462 (e.g., "active devices") corresponding to a user account 460 (e.g., user account A) signed in for the electronic device 201. When a control command (e.g., status identification or function execution) of the controlled device 320 is received from the electronic device 201 through the first path 410, the server 310 may identify whether the registration information 470 of the controlled device 320 is included in active device list 462. When it is identified that the registration information 470 of the controlled device 320 is included in the active device list 462, the server 310 may transmit the control command to the controlled device 320 through the third path 430. The server 310 may receive an execution result corresponding to the control command from the controlled device 320 through the third path 430, and may transfer the execution result to the electronic device 201 through the first path 410.

When removal (e.g., deregistration) of the controlled device 320 is requested by the electronic device 201 or other measures (e.g., an operator), the server 310 may remove the registered information 470 of the controlled device 320 from the active device list 462, and may include the registered information in a removal device list 464 (e.g., "removed devices") corresponding to the user account A 460. The registration information 470 of the controlled device 320 in the removal device list 464 may be valid for a designated period of time (e.g., 30 days), and when the designated period of time elapses, the registration information 470 of the controlled device 320 may be removed from the server 310. When re-registration of the controlled device 320 is requested before the designated period of time elapses, the server 310 may include the registration information 470 in the active device list 462 again.

While the registration information 470 of the controlled device 320 is included in the removal device list 464, the controlled device 320 may be registered for another user account (e.g., user account B). When the server 310 receives a registration request for registering the controlled device 320 for another user account, the server 310 may search the removal device list 464 to remove the registration information 470 of the controlled device 320 from the removal device list 464. Similarly, when a registration request for registering the controlled device 320 for another user account is received while the registration information 470 of the controlled device 320 is included in the active device list 462, the server 310 may search the active device list 462 and remove the registration information 470 of the controlled device 320 from the active device list 462. The server 310 may transmit, to the electronic device 201 corresponding to the user account A, a notification indicating that the controlled device 320 has been registered for another user account or that the controlled device 320 has been removed.

Figure 5:
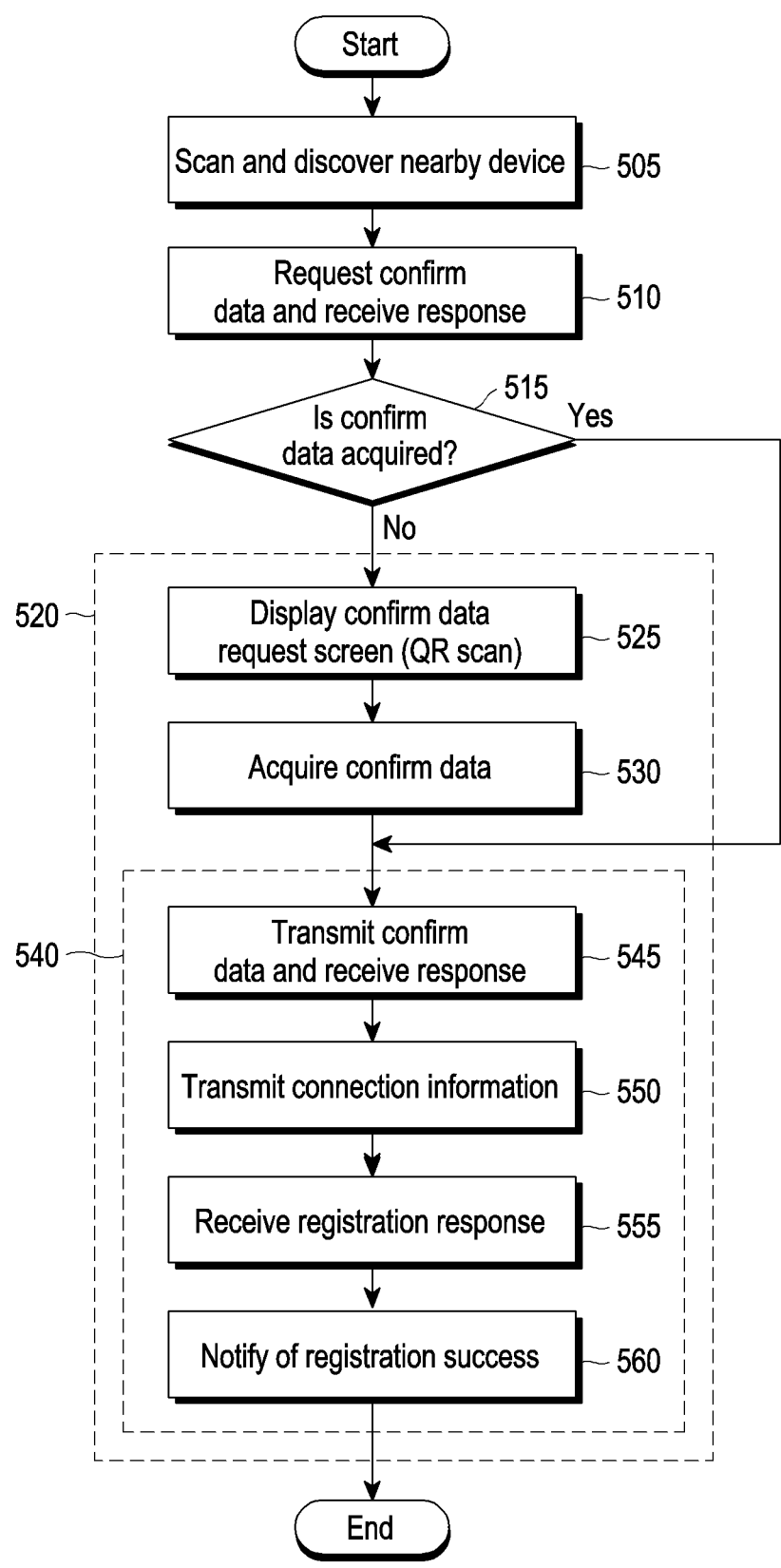
FIG. 5 is a flowchart illustrating a procedure of registering a controlled device according to an embodiment of the disclosure.

FIG. 5 is a flow chart illustrating a procedure of registering a controlled device according to an embodiment of the disclosure.

Referring to, at least one of the operations described below may be executed by the processor 220 of the electronic device 201. The embodiment shown in FIG. 5 is only an example, an operation sequence according to embodiments disclosed in this document may be different from that shown in FIG. 5, and some operations shown in FIG. 5 may be omitted, the order of operations may be changed, or operations may be merged.

Referring to FIG. 5, in operation 505, the electronic device 201 (e.g., the processor 220) may discover at least one controlled device (e.g., the controlled device 320) located nearby through a nearby device scan (e.g., "nearby scan") function. The electronic device 201 (e.g., the processor 220) may display a menu screen for selecting a nearby scan through a display module (e.g., the display module 260) and perform a nearby scan in response to a user input. The nearby scan may include an operation of receiving a signal (e.g., an advertising signal) transmitted by at least one external electronic device (e.g., the controlled device 320) located within a receivable range.

The electronic device 201 (e.g., the processor 220) may acquire identification information (e.g., the identification information 472) (e.g., MAC address) of the controlled device 320 through the nearby scan. The electronic device 201 (e.g., the processor 220) may discover the controlled device 320 by receiving an advertising signal broadcast by the controlled device 320. The advertising signal may include the identification information 472 of the controlled device 320, and the electronic device 201 (e.g., the processor 220) may acquire the identification information 472 from the advertising signal. At least one controlled device may be discovered through a nearby scan, and the electronic device 201 (e.g., the processor 220) may receive a user input for selecting a controlled device (e.g., the controlled device 320) to be registered.

In operation 510, the electronic device 201 (e.g., the processor 220) may request confirm data (e.g., the confirm data 474) for the controlled device 320 from a server (e.g., the server 310) and receive a response from the server 310.

In operation 515, the electronic device 201 (e.g., the processor 220) may determine whether confirm data of the controlled device 320 has been obtained through the response. When the response does not include any confirm data, the electronic device 201 (e.g., the processor 220) may perform a first registration procedure of operation 520. As an example, when the response does not include any confirm data, the electronic device 201 (e.g., the processor 220) may determine that the controlled device 320 is initially registered. When no response is received from the server 310 in operation 510, the electronic device 201 (e.g., the processor 220) may determine that the controlled device 320 is initially registered.

On the other hand, when the response includes confirm data (e.g., the confirm data 474) (e.g., SN) of the controlled device 320, the electronic device 201 (e.g., the processor 220) may perform a second registration procedure of operation 540. In an embodiment, when the response includes the confirm data 474 of the controlled device 320, the electronic device 201 (e.g., the processor 220) may determine that the controlled device 320 is re-registered.

Operation 520 may be a first registration procedure for initial registration, and may include at least one of operation 525, operation 530, operation 545, operation 550, operation 555, or operation 560. According to an embodiment of the disclosure, operation 520 may include at least operation 525 and operation 530.

In operation 525, the electronic device 201 (e.g., the processor 220) may display a confirm data request screen (e.g., a QR scan request screen 730) for requesting confirm data of the controlled device 320. A user may recognize the confirm data request screen and, may scan and/or capture the verification indicia of the controlled device 320 by pointing a camera module (e.g., the camera module 280) of the electronic device 201 at machine-readable verification indicia (e.g., a QR code or bar code) of the controlled device 320. The verification indicia may be attached (or printed) to the outside or inside of the controlled device 320. The verification indicia may be provided to the electronic device 201 directly or through the Internet from the controlled device 320.

The electronic device 201 (e.g., the processor 220) may directly receive an input of confirm data of the controlled device 320 from the user through the confirm data request screen. The electronic device 201 (e.g., the processor 220) may receive the confirm data from an external electronic device (e.g., a manufacturer server) according to a user control through the confirm data request screen. After a BLE communication link between the controlled device 320 and the electronic device 201 has been established, the electronic device 201 (e.g., the processor 220) may receive BLE GATT including the confirm data from the controlled device 320 via the BLE communication link.

In operation 530, the electronic device 201 (e.g., the processor 220) may obtain confirm data (e.g., the confirm data 474) of the controlled device 320 based on the confirm data request screen. The verification indicia scanned and/or captured through the confirm data request screen may not only include the confirm data (e.g., the confirm data 474) of the controlled device 320, but also further include at least one of the device name of the controlled device 320, identification information (e.g., the identification information 472), device type, or device description. For example, the verification indicator may be a QR code, and relevant information of the controlled device 320 included in the QR code may be referred to as QR raw data.

In operation 545, the electronic device 201 (e.g., the processor 220) may transmit the confirm data 474 (e.g., obtained from the QR code of the controlled device 320) to the controlled device 320, and may receive a response indicating that the confirm data 474 has been identified from the controlled device 320. According to an embodiment of the disclosure (not illustrated), when a response indicating that the confirm data 474 has been identified is not received from the controlled device 320, subsequent operations (e.g., operations 550, 555, and 560) may be omitted, and the electronic device 201 (e.g., the processor 220) may display a notification notifying that the controlled device 320 is not confirmed.

In operation 550, the electronic device 201 (e.g., the processor 220) may transmit connection information required for connection with the server 310 to the controlled device 320. The connection information may be transmitted to the controlled device 320 together with account information indicating a user account (e.g., user account A) including a signature for the electronic device 201. In an embodiment, the connection information may include an access token and/or access point (AP) information. The AP information may include at least one of a MAC address, a network name (e.g., service set identifier (SSID), or password) of an AP accessible for Wi-Fi communication. In an embodiment, an access token may include a confirmation code and/or security credentials used by the AP to confirm the controlled device 320. The controlled device 320 may perform connection to the AP based on the connection information, and may request registration of the controlled device 320 for the user account A from the server 310 through the AP. The controlled device 320 may provide registration information (e.g., the registration information 470) of the controlled device 320 to the server 310 while requesting registration from the server 310 so as to allow the server 310 to include the registration information in an active device list (e.g., the active device list 462).

In operation 555, the electronic device 201 (e.g., the processor 220) may receive a registration response from the server 310. The registration response may include a value indicating that the controlled device 320 has been successfully registered in the server 310. The electronic device 201 (e.g., the processor 220) may receive, from the controlled device 320, a message notifying that the controlled device is connected to the server 310 (e.g., online state) instead of operation 555 or in parallel with operation 555.

In operation 560, the electronic device 201 (e.g., the processor 220) may output a registration success notification notifying that the controlled device 320 has been successfully registered. For example, the notification of successful registration may be provided through a screen, sound (music or voice), and/or vibration, but may not be limited thereto. Although not shown, the electronic device 201 (e.g., the processor 220) may acquire an active device list (e.g., the active device list 462) from the server 310 based on the user account A, and may transmit a control command for the controlled device 320 included in the active device list 462 to the controlled device 320 through the server 310 or directly.

Operation 540 may be a second registration procedure in which a part (e.g., operation 525 and/or operation 530) of the first registration procedure is omitted for re-registration, and may include at least one of operation 545, operation 550, operation 555, or operation 560 in an embodiment. When the controlled device 320 is removed (or unregistered) from the server 310, the electronic device 201 (e.g., the processor 220) may re-register the controlled device 320 in the server 310 without reading verification indicia (e.g., QR scan or bar code scan) by using the confirm data 474 obtained in operation 510.

In operation 545, the electronic device 201 (e.g., the processor 220) may transmit the confirm data 474 (e.g., received from the server 310) to the controlled device 320 and receive, from the controlled device 320, a response indicating that the confirm data 474 has been identified.

In operation 550, the electronic device 201 (e.g., the processor 220) may transmit connection information required for connection with the server 310 to the controlled device 320. The connection information may be transmitted to the controlled device 320 together with account information indicating a user account (e.g., user account A) including a signature for the electronic device 201. In an embodiment, the connection information may include an access token and/or access point (AP) information. The controlled device 320 may connect to the AP based on the connection information, and may request registration of the controlled device 320 for the user account A from the server 310 through the AP. The controlled device 320 may provide registration information (e.g., the registration information 470) of the controlled device 320 to the server 310 while requesting registration from the server 310 so as to allow the server 310 to include the registration information in an active device list (e.g., the active device list 462).

In operation 555, the electronic device 201 (e.g., the processor 220) may receive a registration response from the server 310. The registration response may include a value indicating that the controlled device 320 has been successfully registered in the server 310. After transmitting the connection information to the server 310, the electronic device 201 (e.g., the processor 220) may transmit a message to the server 310 inquiring whether the server is connected to the controlled device 320, and may receive a message indicating that the controlled device 320 has been connected to the server 310 (e.g., online state) from the server 310. The registration response may be received from the controlled device 320, instead of the server 310, to the electronic device 201.

In operation 560, the electronic device 201 (e.g., the processor 220) may visually, audibly, and/or tactilely provide a registration success notification notifying that the controlled device 320 has been successfully registered. Although not shown, the electronic device 201 (e.g., the processor 220) may acquire an active device list (e.g., the active device list 462) from the server 310 based on the user account A, and may transmit a control command for the controlled device 320 included in the active device list 462 to the controlled device 320 through the server 310 or directly.

FIG. 6 is a signal flowchart (sequence diagram) illustrating an example of a procedure of initially registering a controlled device according to an embodiment of the disclosure.

Referring to FIG. 6, some of the operations described below may be executed by the processor 220 of the electronic device 201. The embodiment shown in FIG. 6 is only an example, and an operation sequence according to embodiments disclosed in this document may be different from that shown in FIG. 6. Further, some operations shown in FIG. 6 may be omitted, the sequence between operations may be changed, or operations may be merged.

Figures 7A, 7B:
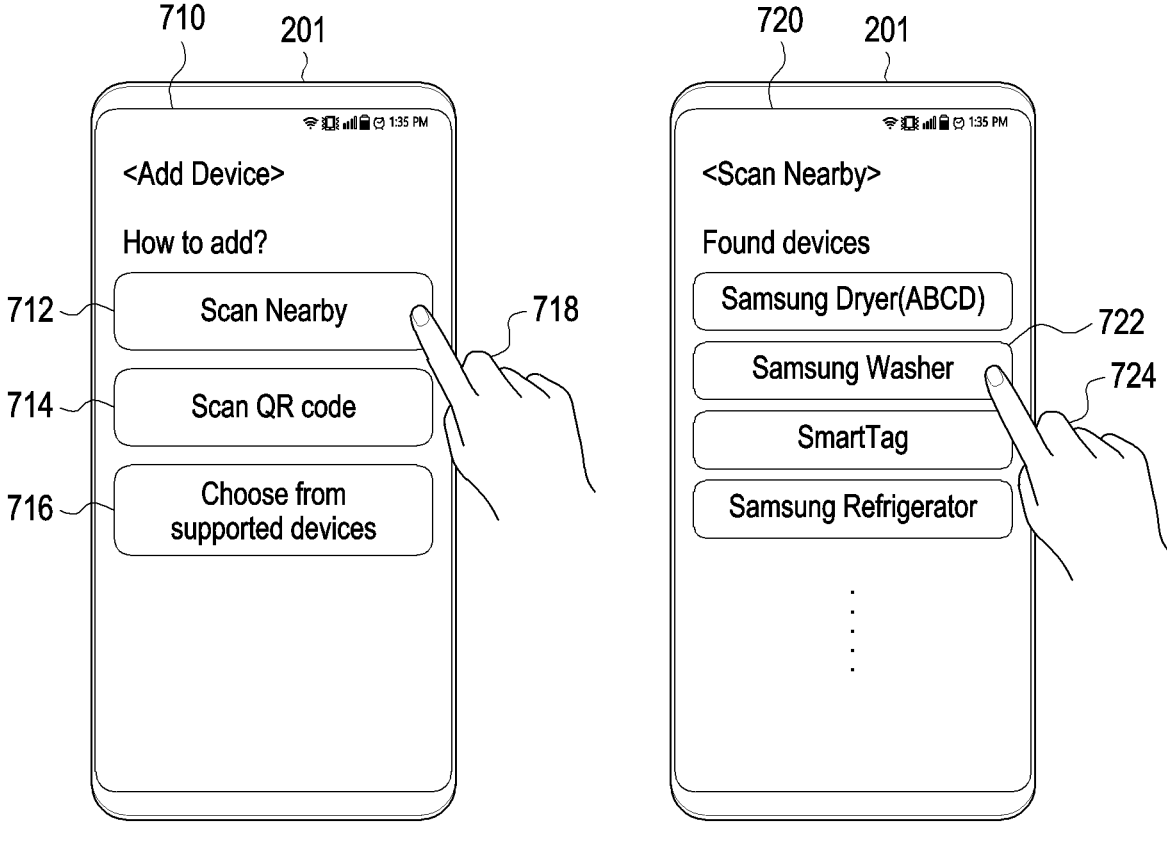
FIGS. 7A, 7B, 7C, 7D, 7E, and 7F illustrate examples of a user interface illustrating a procedure of registering a controlled device in a server according to various embodiments of the disclosure.

Referring to FIG. 6, in operation 602, the electronic device 201 (e.g., the processor 220) may execute a nearby device scan through a device addition screen 710 of FIG. 7A for example, so as to discover at least one controlled device located nearby. The electronic device 201 may display at least one controlled device discovered through a nearby scan through a nearby scan screen 720 of FIG. 7B, for example. The electronic device 201 may acquire identification information (e.g., identification information 472) (e.g., MAC address) of the at least one controlled device through a nearby scan. In operation 604, the electronic device 201 (e.g., the processor 220) may receive a user input (e.g., a user input 724 of FIG. 7B) for selecting a controlled device 320 that a user wants to install from among the displayed at least one controlled device.

In operation 606, the electronic device 201 (e.g., the processor 220) may transmit, to the server 310, a registration inquiry message for identifying whether the confirm data of the controlled device 320 is stored in the server 310 based on the identification information 472 of the controlled device 320. The registration inquiry message may be transmitted from the electronic device 201 to the server 310 through the first path 410. The registration inquiry message may include account information indicating a user account (e.g., user account A) including a signature for the electronic device 201 and the identification information 472 (e.g., "MAC" field including a MAC address).

In response to receiving the registration inquiry message, the server 310 may search an active device list 462 and/or a removal device list 464 based on the account information and the identification information 472 (e.g., MAC address), and may identify that confirm data of the controlled device 320 is not included in the active device list 462 and/or the removal device list 464. In operation 612, the server 310 may transmit a response message not including confirm data of the controlled device 320 to the electronic device 201. The response message may include a value indicating that the controlled device 320 is not registered and/or has never been registered (unregistered). In an embodiment, the electronic device 201 (e.g., the processor 220) may recognize that the controlled device 320 is not registered and/or has never been registered according to the response message.

In operations 608 and 610, the electronic device 201 (e.g., the processor 220) may establish a communication link (e.g., the second path 420) with the controlled device 320 regardless of operations 606 and 612. The second path 420 may be established based on short-range wireless communication such as D2D, Wi-Fi, or BLE. In operation 608, the electronic device 201 (e.g., the processor 220) may transmit a connection request message to the controlled device 320. In operation 610, the controlled device 320 may identify the electronic device 201 according to the connection request message and transmit a confirmation request message for verifying ownership of the electronic device 201 to the electronic device 201. Although operations 608 and 610 are illustrated as occurring between operations 606 and 612, execution of operations 608 and 610 is not limited thereto.

In operation 614, according to identifying that a response message of operation 612 does not include the confirm data of the controlled device 320, the electronic device 201 (e.g., the processor 220) may display a screen (e.g., a QR scan request screen 730 of FIG. 7C) for obtaining confirm data of the controlled device 320. In operation 616, the electronic device 201 (e.g., the processor 220) may acquire confirm data 474 (e.g., SN) of the controlled device 320 from the QR code scanned and/or captured through the QR scan request screen.

In operation 618, the electronic device 201 (e.g., the processor 220) may transmit the confirm data 474 (e.g., SN) to the controlled device 320. The controlled device 320 may determine that the electronic device 201 has ownership of the controlled device 320 based on the identification of the confirm data 474, and may transmit a response message (e.g., "OK") identifying ownership of the electronic device 201 to the electronic device 201 in operation 620.

In operation 622, the electronic device 201 (e.g., the processor 220) may transmit, to the controlled device 320, connection information required for connection with the server 310 (e.g., "TOKEN" indicating an access token and "AP_info" indicating AP information) and account information (e.g., "ACC" indicating a user account A including a signature for the electronic device 201). The electronic device 201 may display an AP selection screen (e.g., an AP selection screen 740 of FIG. 7D) for selecting an AP to be used for connection of the controlled device 320 to generate the connection information. The AP information may include the MAC address of the AP selected through the AP selection screen. The electronic device 201 may release the second path 420 between the electronic device 201 and the controlled device 320 after transmitting the connection information. After transmitting the connection information, the electronic device 201 may display a "registration in progress" screen (e.g., a registration in progress screen 750 in FIG. 7E) for notifying that registration of the controlled device 320 is in progress.

In operation 624, the controlled device 320 may perform connection to an AP (not shown) indicated by the AP information based on the connection information, may establish a third path 430 with the server 310 through the AP, and may transmit a registration request message to the server 310 through the third path 430. The registration request message may include at least one of account information ("ACC"), identification information 472 (e.g., "MAC"), or confirm data 474 (e.g., "SN") of the electronic device 201. The registration request message may include a first registration request message and a second registration request message. The controlled device 320 may transmit a first registration request message including account information ("ACC") and identification information 472 (e.g., "MAC"), and may transmit a second registration request message including identification information 472 (e.g., "MAC") and confirm data 474 (e.g., "SN") of the controlled device 320.

In operation 626, the server 310 may store registration information 470 including identification information 472 (e.g., "MAC") and confirm data 474 (e.g., "SN") of the controlled device 320 in the active device list 462 corresponding to the account information of the electronic device 201.

In operation 628, the server 310 may transmit a registration response message notifying that the registration of the controlled device 320 has been completed to the electronic device 201. The registration response message may include information (or a value) notifying that the controlled device 320 is connected to the server 310. In an embodiment, the registration response message may be transmitted from the server 310 in response to a request from the electronic device 201. The electronic device 201 (e.g., the processor 220) may receive, from the controlled device 320, a message notifying that the controlled device is connected to the server 310. The server 310 may transmit a message notifying that registration has been completed to the controlled device

320. After the registration procedure is completed, the controlled device 320 may perform a native function in response to a control command received from the server 310 or report a status to the server 310 while being connected to the server 310.

In operation 630, the electronic device 201 (e.g., the processor 220) may output a registration success notification based on reception of the registration response message. The registration success notification may be provided through a screen (e.g., the registration success screen 760 of FIG. 7F), sound (music or voice), and/or vibration, but may not be limited thereto.

FIGS. 7A, 7B, 7C, 7D, 7E, and 7F illustrate examples of a user interface illustrating a procedure of registering a controlled device in a server according to various embodiments of the disclosure.

Referring to FIG. 7A, the electronic device 201 may display a device addition screen (e.g., "Add Device") 710 in response to a user request or a designated request. The device addition screen 710 may include at least one of a first menu item 712 for a nearby scan (e.g., "Scan Nearby"), a second menu item 714 for scanning a QR code (e.g., "Scan QR code"), or a third menu item 716 for device selection (e.g., "Choose from supported devices"). The electronic device 201 may detect a user input 718 for the first menu item 712 and display a nearby device scan screen (e.g., "Scan Nearby") 720 of FIG. 7B.

Referring to FIG. 7B, a nearby scan screen 720 may include items representing at least one controlled device discovered by the electronic device 201 through a nearby scan, such as a dryer, a washing machine, a smart tag, and a refrigerator. The electronic device 201 may detect a user input 724 for the washing machine item 722 and display a QR scan request screen (e.g., "QR confirm") 730 of FIG. 7C.

Figure 7C:
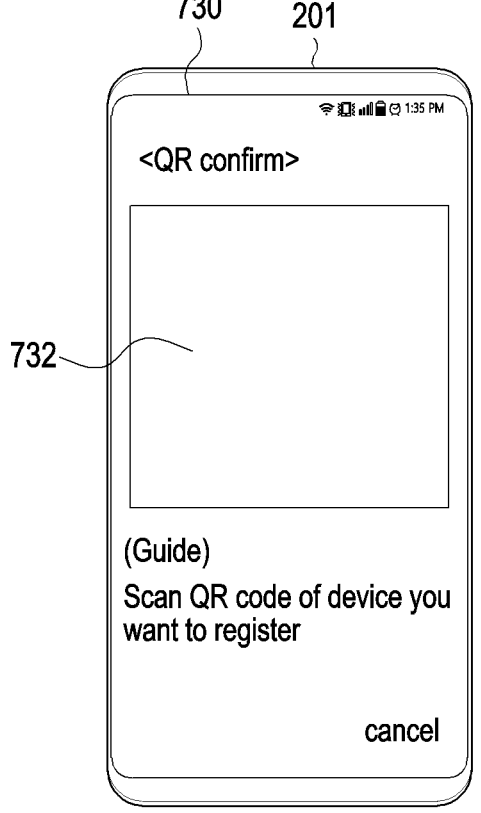

Referring to FIG. 7C, the QR scan request screen 730 may include a camera input area 732 for QR scan. When the QR code of the controlled device (e.g., the controlled device 320) is scanned and/or captured through the QR scan request screen 730, the electronic device 201 may display an AP selection screen (e.g., "Select AP") 740 of FIG. 7D. The user may scan and/or capture the QR code through the camera input area 732 by pointing the camera of the electronic device 201 at the QR code of the washing machine.

Figure 7D:
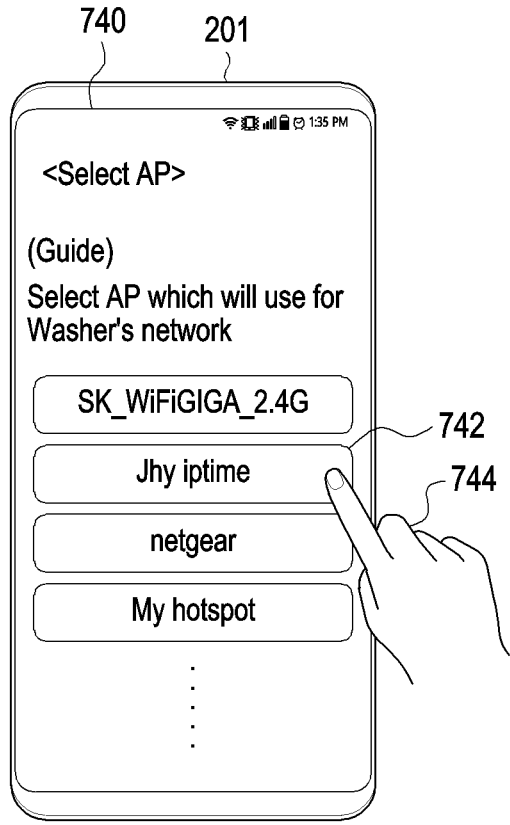

Referring to FIG. 7D, the AP selection screen 740 may include one or more AP items indicating one or more APs usable for the network of the washing machine. When a user input 744 for one AP item 742 among the one or more AP items is detected, the electronic device 201 may display a registration in progress screen (e.g., "Registering") 750 of FIG. 7E.

Figure 7E:
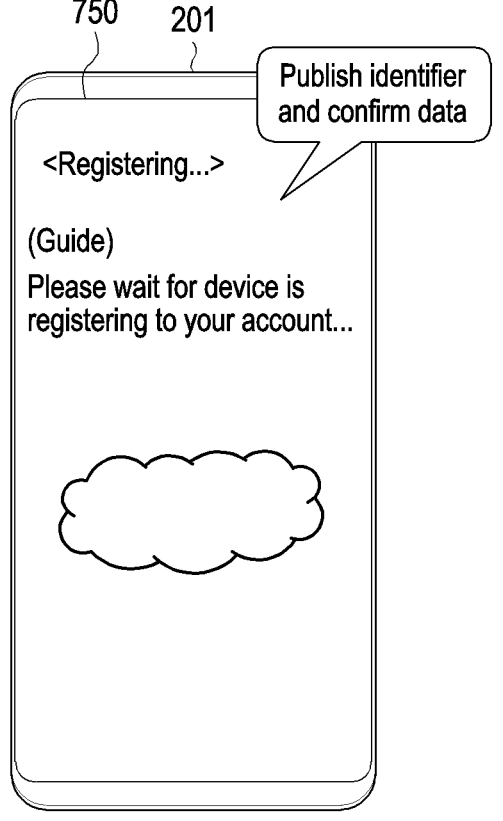

Referring to FIG. 7E, a registration in progress screen 750 may include a phrase (e.g., "Please wait for device is registering to your account . . . ") notifying that device registration to a user account is in progress. When a registration completion message indicating that the registration of the washing machine to the server 310 has been completed is received from the server 310, the electronic device 201 may display a registration success screen (e.g., "Success!") 760 of FIG. 7F. For example, notification of successful registration may be provided through a screen, sound (music or voice), and/or vibration, but may not be limited thereto.

Figure 7F:

Referring to FIG. 7F, the registration success screen 760 may include a phrase (e.g., "Your device is successfully registered") notifying that device registration has been successfully completed.

According to an embodiment of the disclosure, the electronic device 201 may request removal (or deregistration) of the controlled device 320 from the server 310 according to a user request (e.g., a user input) or for another reason (e.g., detecting a failure of the controlled device 320). In response to the request, the server 310 may remove registration information 470 of the controlled device 320 from the active device list 462 and include the registration information 470 in the removal device list 464. The registration information 470 may be automatically (e.g., without a request from the electronic device 201) removed from the removal device list 464 after a designated period of time. The server 310 may provide the confirm data 474 from among registration information 470 included in the active device list 462 and/or the removal device list 464 to the electronic device 201 at the request of the electronic device 201.

Figure 8:
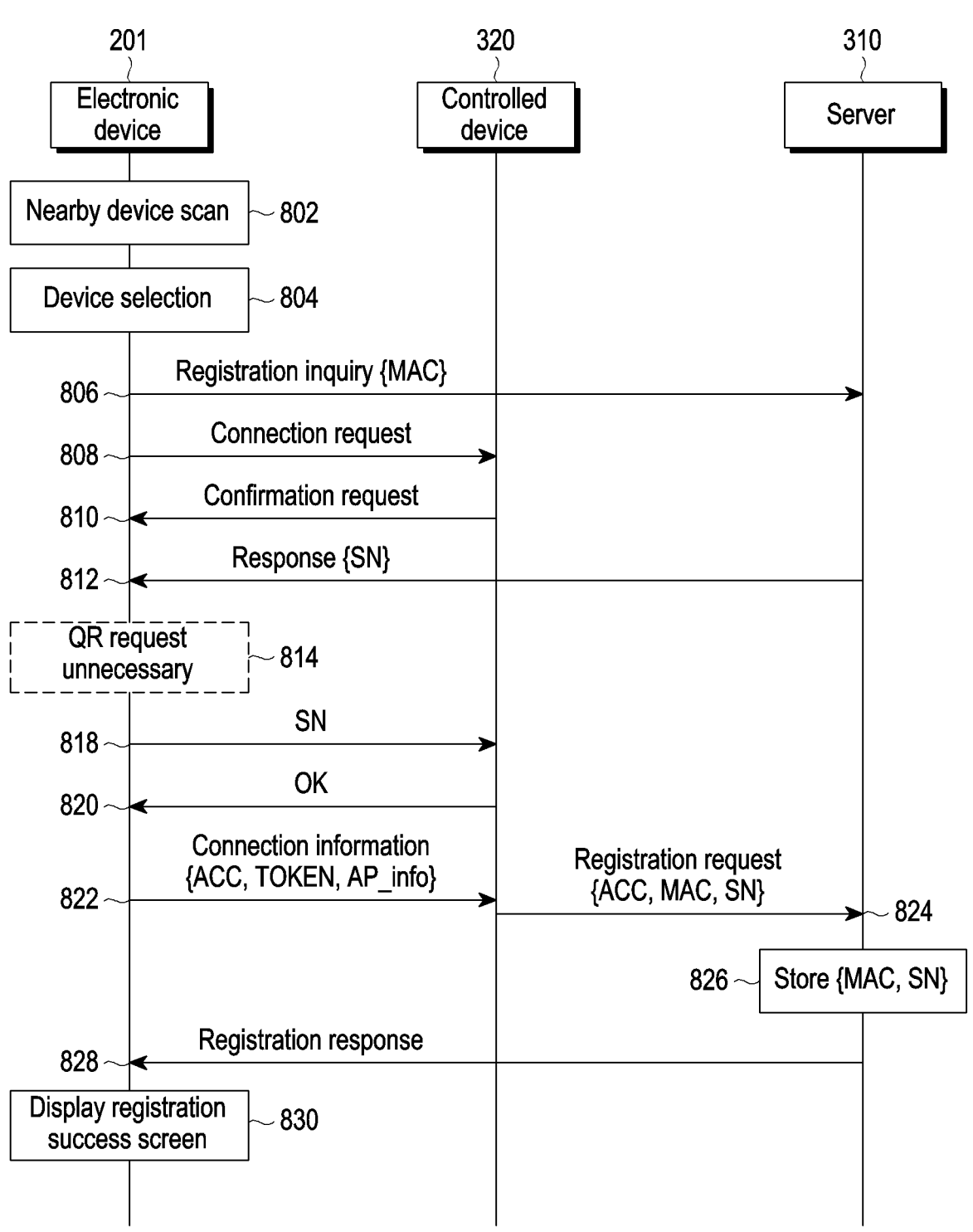
FIG. 8 is a signal flow diagram illustrating an example of a procedure of re-registering a controlled device according to an embodiment of the disclosure.

FIG. 8 is a signal flow diagram illustrating an example of a procedure of re-registering a controlled device according to an embodiment of the disclosure.

Referring to FIG. 8, some of the operations described below may be executed by the processor 220 of the electronic device 201. The embodiment shown in FIG. 8 is only an example, and an operation sequence according to embodiments disclosed in this document may be different from that shown in FIG. 8. Further, some operations shown in FIG. 8 may be omitted, the sequence between operations may be changed, or operations may be merged.

Figures 9A, 9B:
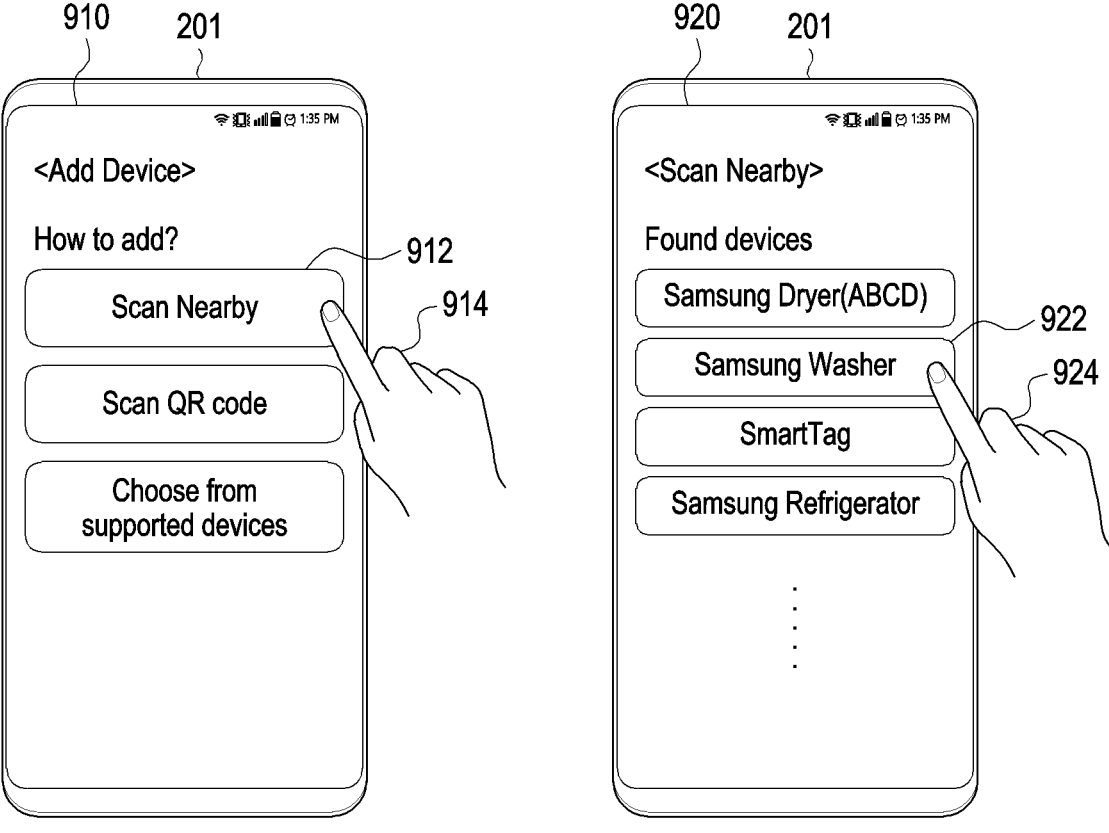

Referring to FIG. 8, in operation 802, the electronic device 201 (e.g., the processor 220) may execute a nearby device scan through a device addition screen 910 of FIG. 9A for example, so as to search for at least one controlled device located nearby and discover the controlled device 320. The electronic device 201 may display at least one controlled device discovered through a nearby scan through a nearby scan screen 920 of FIG. 9B, for example. The electronic device 201 may acquire identification information (e.g., identification information 472) (e.g., MAC address) of the at least one controlled device through a nearby scan. In operation 804, the electronic device 201 may receive a user input (e.g., a user input 924 of FIG. 9B) for selecting a controlled device 320 that a user wants to install among the displayed at least one controlled device.

In operation 806, the electronic device 201 (e.g., the processor 220) may transmit, to the server 310, a registration inquiry message for identifying whether the confirm data of the controlled device 320 is stored in the server 310 based on the identification information 472 (e.g., "MAC" which contains MAC address) of the controlled device 320. The registration inquiry message may be transmitted from the electronic device 201 to the server 310 through the first path 410. The registration inquiry message may include account information indicating a user account (e.g., user account A) including a signature for the electronic device 201 and the identification information 472 (e.g., MAC address).

In response to receiving the registration inquiry message, the server 310 may search an active device list 462 and/or a removal device list 464 based on the account information and the identification information 472 (e.g., MAC address), and may identify that confirm data (e.g., the confirm data 474) (e.g., SN) of the controlled device 320 is included in the active device list 462 and/or the removal device list 464. In operation 812, the server 310 may transmit a response message including the confirm data 474 (e.g., SN) of the controlled device 320 to the electronic device 201. The response message may include a value indicating that the controlled device 320 is registered and/or has ever been registered. The electronic device 201 may recognize that the controlled device 320 is registered, and/or has ever been registered within a designated period of time (e.g., 30 days) according to the response message.

In operations 808 and 810, the electronic device 201 (e.g., the processor 220) may establish a communication link (e.g., the second path 420) with the controlled device 320 regardless of operations 806 and 812. The second path 420 may be established based on short-range wireless communication such as D2D, Wi-Fi, or BLE. In operation 808, the electronic device 201 may transmit a connection request message to the controlled device 320. In operation 810, the controlled device 320 may identify the electronic device 201 according to the connection request message and transmit a confirmation request message for verifying ownership of the electronic device 201 to the electronic device 201. Although operations 808 and 810 are illustrated as occurring between operations 806 and 812, execution of operations 808 and 810 is not limited thereto.

In operation 814, according to identifying that a response message of operation 812 includes the confirm data 474 (e.g., SN) of the controlled device 320, the electronic device 201 (e.g., the processor 220) may recognize that acquiring confirm data is unnecessary, and may proceed to operation 818 without displaying a confirm data request screen (e.g., the QR scan request screen 730 of FIG. 7C) requiring user manipulation (e.g., omitting operations 614 and 616).

In operation 818, the electronic device 201 (e.g., the processor 220) may transmit the confirm data 474 (e.g., SN) to the controlled device 320. The controlled device 320 may determine that the electronic device 201 has ownership of the controlled device 320 based on the identification of the confirm data 474, and may transmit a response message (e.g., "OK") identifying ownership of the electronic device 201 to the electronic device 201 in operation 820.

In operation 822, the electronic device 201 (e.g., the processor 220) may transmit, to the controlled device 320, connection information required for connection with the server 310 (e.g., "TOKEN" indicating an access token and "AP_info" indicating AP information) and account information (e.g., "ACC" indicating a user account A including a signature for the electronic device 201). In an embodiment, the electronic device 201 may display an AP selection screen (e.g., an AP selection screen 930 of FIG. 9C) for selecting an AP to be used for connection of the controlled device 320 to generate the connection information. The AP information may include the MAC address of the AP selected through the AP selection screen. The electronic device 201 may release the second path 420 between the electronic device 201 and the controlled device 320 after transmitting the connection information. After transmitting the connection information, the electronic device 201 may display a registration in progress screen (e.g., a registration in progress screen 940 in FIG. 9D) for notifying that registration of the controlled device 320 is in progress.

In operation 824, the controlled device 320 may perform connection to an AP (not shown) indicated by the AP information based on the connection information, may establish a third path 430 with the server 310 through the AP, and may transmit a registration request message to the server 310 through the third path 430. In an embodiment, the registration request message may include at least one of account information ("ACC"), identification information 472 (e.g., "MAC"), or confirm data 474 (e.g., "SN") of the electronic device 201. The registration request message may include a first registration request message and a second registration request message. The controlled device 320 may transmit a first registration request message including account information ("ACC") and identification information 472 (e.g., "MAC"), and may transmit a second registration request message including identification information 472 (e.g., "MAC") and confirm data 474 (e.g., "SN") of the controlled device 320.

In operation 826, the server 310 may store registration information 470 including identification information 472 (e.g., "MAC") and confirm data 474 (e.g., "SN") of the controlled device 320 in the active device list 462 corresponding to the account information of the electronic device 201. The server 310 may transmit a message notifying that registration has been completed to the controlled device 320. After the registration procedure is completed, the controlled device 320 may perform a native function in response to a control command received from the server 310 or report a status to the server 310 while being connected to the server 310.

In operation 828, the server 310 may transmit a registration response message notifying that the registration of the controlled device 320 has been completed to the electronic device 201. The registration response message may include information (or a value) notifying that the controlled device 320 is connected to the server 310. The registration response message may be transmitted from the server 310 in response to a request from the electronic device 201. In an embodiment, the electronic device 201 (e.g., the processor 220) may receive, from the controlled device 320, a message notifying that the controlled device is connected to the server 310.

In operation 830, the electronic device 201 (e.g., the processor 220) may output a registration success notification based on reception of the registration response message. For example, the registration success notification may be provided through a screen (e.g., the registration success screen 950 of FIG. 9E), sound (music or voice), and/or vibration, but may not be limited thereto.

FIGS. 9A, 9B, 9C, 9D, and 9E illustrate examples of a user interface illustrating a procedure of re-registering a controlled device in a server according to various embodiments of the disclosure.

Referring to FIG. 9A, the electronic device 201 may display a device addition screen (e.g., "Add Device") 910 in response to a user request or a designated request. In an embodiment, the device addition screen 710 may include a first menu item 912 for a nearby scan (e.g., "Scan Nearby"). The electronic device 201 may detect a user input 914 for the first menu item 912 and display a nearby device scan screen (e.g., "Scan Nearby") 920 of FIG. 9B.

Referring to FIG. 9B, a nearby scan screen 920 may include items representing at least one controlled device discovered by the electronic device 201 through a nearby scan, such as a dryer, a washing machine, a smart tag, and a refrigerator. The electronic device 201 may detect a user input 924 for a washing machine item 922, may acquire confirm data (e.g., the confirm data 474) for the washing machine from the server 310 through operations 806 and 812, and may display an AP selection screen (e.g., "Select AP") 930 of FIG. 9C. The electronic device 201 may be configured not to display a confirm data request screen (e.g., QR scan request screen) before displaying the AP selection screen (e.g., "Select AP") 930. The electronic device 201 may display a phrase (not shown) indicating that the washing machine has been pre-registered before displaying the AP selection screen (e.g., "Select AP") 930.

Referring to FIG. 9C, the AP selection screen 930 may include one or more AP items indicating one or more Aps usable for the network of the washing machine. When a user input 934 for one AP item 932 among the one or more AP items is detected, the electronic device 201 may display a registration in progress screen (e.g., "Registering") 940 of FIG. 9D.

Referring to FIG. 9D, a registration in progress screen 940 may include a phrase (e.g., "Please wait for device is registering to your account . . . ") notifying that device registration to a user account is in progress. When a registration completion message indicating that the registration of the washing machine to the server 310 has been completed is received from the server 310, the electronic device 201 may output a registration success screen (e.g., "Success!") 950 of FIG. 9E.

Figure 9E:

Referring to FIG. 9E, the registration success screen 950 may include a phrase (e.g., "Your device is successfully registered") notifying that device registration has been successfully completed.

Figure 10:
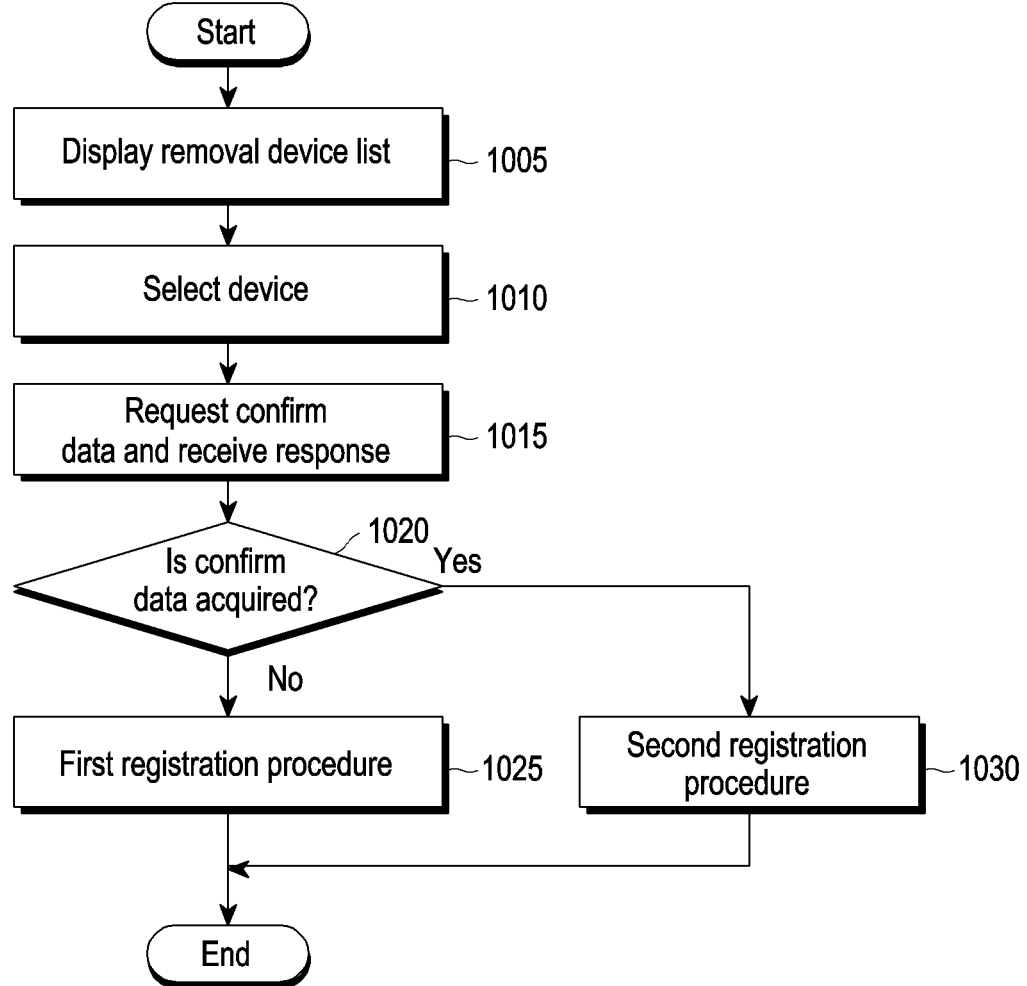
FIG. 10 is a flowchart illustrating a procedure of re-registering a controlled device according to an embodiment of the disclosure.

FIG. 10 is a flowchart illustrating a procedure of re-registering a controlled device according to an embodiment of the disclosure.

Referring to FIG. 10, at least one of the operations described below may be executed by the processor 220 of the electronic device 201. The embodiment shown in FIG. 10 is only an example, and an operation sequence according to an embodiment disclosed in this document may be different from that shown in FIG. 10. Further, some operations shown in FIG. 10 may be omitted, the sequence between operations may be changed, or operations may be merged.

Referring to FIG. 10, in operation 1005, the electronic device 201 (e.g., the processor 220) may display a removal device list (e.g., the removal device list 464) including at least one controlled device removed within a designated period of time (e.g., 30 days). The removal device list 464 may be displayed on the display module 260 of the electronic device 201 in response to a user input 1126 to a recently registered device request item 1124 of FIG. 11B or a user input 1134 to a recently removed device item 1132 of FIG. 11C. The electronic device 201 (e.g., the processor 220) may display a removal device list screen 1140 of FIG. 11D including the removal device list 464.

In operation 1010, the electronic device 201 (e.g., the processor 220) may receive a user input (e.g., user input 1144) indicating a controlled device (e.g., the controlled device 320) to be re-registered, through the removal device list 464.

In operation 1015, the electronic device 201 (e.g., the processor 220) may request confirm data (e.g., the confirm data 474) for the controlled device 320 from a server (e.g., the server 310), and may receive a response from the server 310.

In operation 1020, the electronic device 201 (e.g., the processor 220) may determine whether confirm data (e.g., the confirm data 474) of the controlled device 320 has been obtained through the response. When the response does not include any confirm data, the electronic device 201 (e.g., the processor 220) may perform a first registration procedure in operation 1025. When the controlled device 320 is removed from the server 310 and a designated period of time (e.g., 30 days) has elapsed, the server 310 may remove confirm data (e.g., the confirm data 474), and thus may not provide the confirm data through the response.

The first registration procedure may include at least one of operations 525, 530, 545, 550, 555, and 560. According to an embodiment of the disclosure, the first registration procedure may include at least operations 525 and 530. The electronic device 201 (e.g., the processor 220) may register the controlled device 320 in the server 310, by using confirm data 474 (obtained, for example, through QR scanning).

On the other hand, when the response includes the confirm data 474 (e.g., SN) of the controlled device 320, the electronic device 201 (e.g., the processor 220) may perform a second registration procedure in operation 1030. When the response includes the confirm data 474 of the controlled device 320, the electronic device 201 (e.g., the processor 220) may determine that the controlled device 320 is re-registered. The second registration procedure may be a second registration procedure in which a part (e.g., operation 525 and/or operation 530) of the first registration procedure is omitted for re-registration, and may include at least one of operation 545, operation 550, operation 555, or operation 560. In operation 1030, the electronic device 201 (e.g., the processor 220) may re-register the controlled device 320 in the server 310 without an operation (e.g., QR scan) for obtaining confirm data, by using the confirm data 474 obtained in operation 1015.

FIGS. 11A, 11B, 11C, 11D, 11E, 11F, and 11G illustrate examples of a user interface illustrating a procedure of re-registering a removed controlled device to a server according to various embodiment of the disclosure.

Figures 11A, 11B:
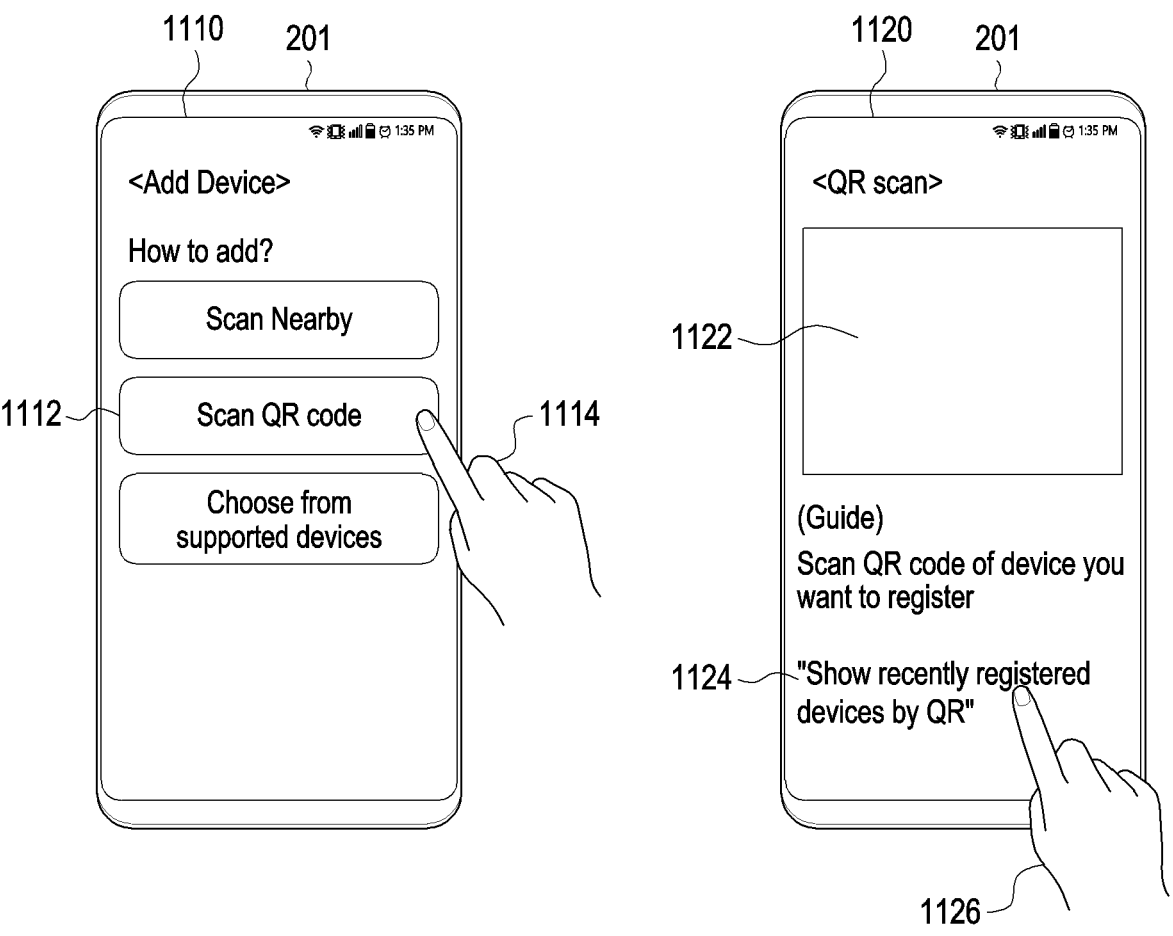
FIGS. 11A, 11B, 11C, 11D, 11E, 11F, and 11G illustrate examples of a user interface illustrating a procedure of re-registering a controlled device in a server according to various embodiments of the disclosure.

Referring to FIG. 11A, the electronic device 201 may display a device addition screen (e.g., "Add Device") 1110 in response to a user request or a designated request. In an embodiment, the device addition screen 1110 may include a menu item 1112 for scanning a QR code (e.g., "Scan QR code"). The electronic device 201 may detect a user input 1114 for the menu item 1112 and display a QR scan request screen (e.g., "QR scan") 1120 of FIG. 11B.

Referring to FIG. 11B, the QR scan request screen 1120 may include a camera input area 1122 for QR scan and a recently registered device request item 1124. For example, the recently registered device request item 1124 may include a phrase (e.g., "Show recently registered devices by QR") requesting to show recently registered devices by a QR code. The electronic device 201 may detect a user input 1126 for the recently registered device request item 1124 and display a removal device list screen (e.g., "Recently removed devices") 1140 of FIG. 11D.

Figure 11C:
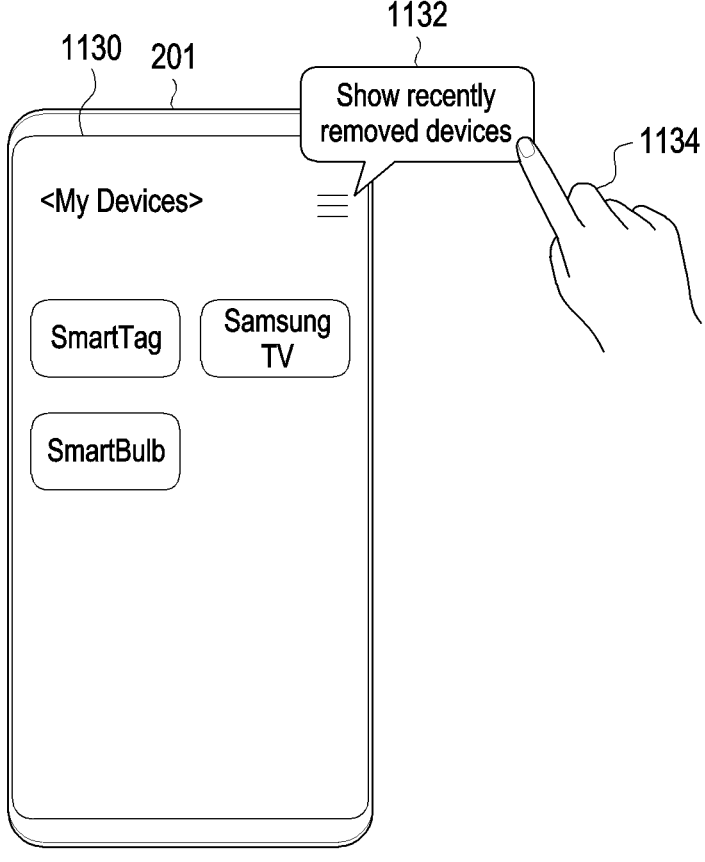

Referring to FIG. 11C, the electronic device 201 may display a 'my device screen' (e.g., "My Devices") 1130 in response to a user request or a designated request. The 'my device screen' 1130 may include a recently removed device request item 1132 together with one or more registered controlled devices. The electronic device 201 may detect a user input 1134 for the recently removed device request item 1132 and display a removal device list screen 1140 of FIG. 11D (e.g., "Recently removed devices").

Figures 11D, 11E:
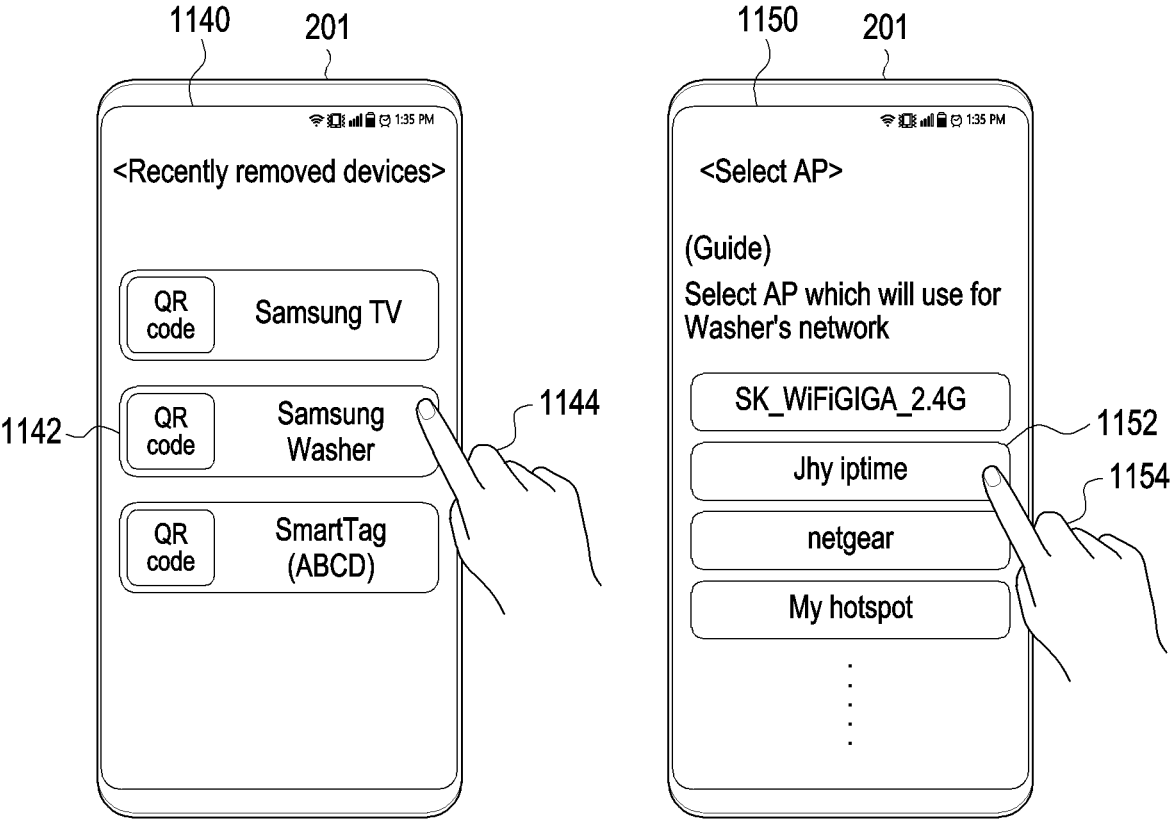

Referring to FIG. 11D, the removal device list screen 1140 may include at least one controlled device that has recently (e.g., within 30 days) been registered and then removed in the electronic device 201, for example, items indicating a TV, a washing machine, and a smart tag. Each item may include a device name and a QR code. The electronic device 201 may detect a user input 1144 for a washing machine item 1142, and may acquire confirm data (e.g., the confirm data 474) about the washing machine from the server 310 and display an AP selection screen (e.g., "Select AP") 1150 of FIG. 11E through operations 1015 and 1020. The electronic device 201 may be configured not to display the QR scan request screen before displaying the AP selection screen (e.g., "Select AP") 1150. The electronic device 201 may display a phrase (not shown) indicating that the washing machine has been pre-registered before displaying the AP selection screen (e.g., "Select AP") 1150.

Referring to FIG. 11E, the AP selection screen 1150 may include one or more AP items indicating one or more APs usable for the network of the washing machine. When a user input 1154 for one AP item 1152 from among the one or more AP items is detected, the electronic device 201 may display a registration in progress screen (e.g., "Registering") 1160 of FIG. 11F.

Figure 11F:
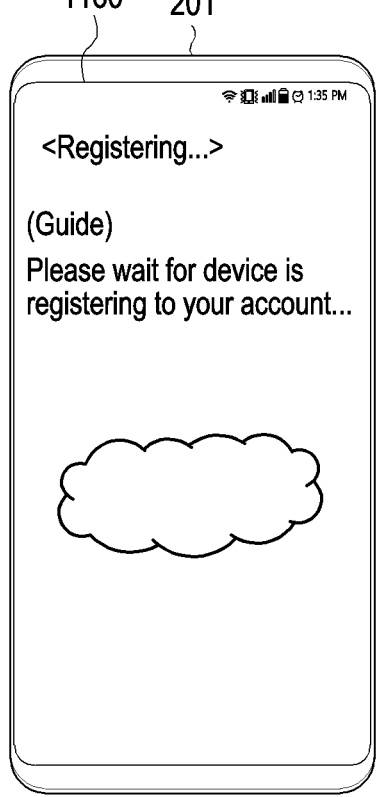

Referring to FIG. 11F, the registration in progress screen 1160 may include a phrase (e.g., "Please wait for device is registering to your account . . . ") notifying that device registration to a user account is in progress. When a registration completion message indicating that the registration of the washing machine to the server 310 has been completed is received from the server 310, the electronic device 201 may display a registration success screen (e.g., "Success!") 1170 of FIG. 11G.

Figure 11G:

Referring to FIG. 11G, the registration success screen 1170 may include a phrase (e.g., "Your device is successfully registered") notifying that device registration has been successfully completed.

According to an electronic device for managing a controlled device and an operating method thereof according to embodiments of the disclosure, when it is difficult to scan a QR code of the controlled device because the controlled device is heavy or installed in a location to which access is difficult, the controlled device can be easily and quickly re-registered in the server by using the confirm data of the controlled device pre-registered on the server without QR scanning.

Figure 12:
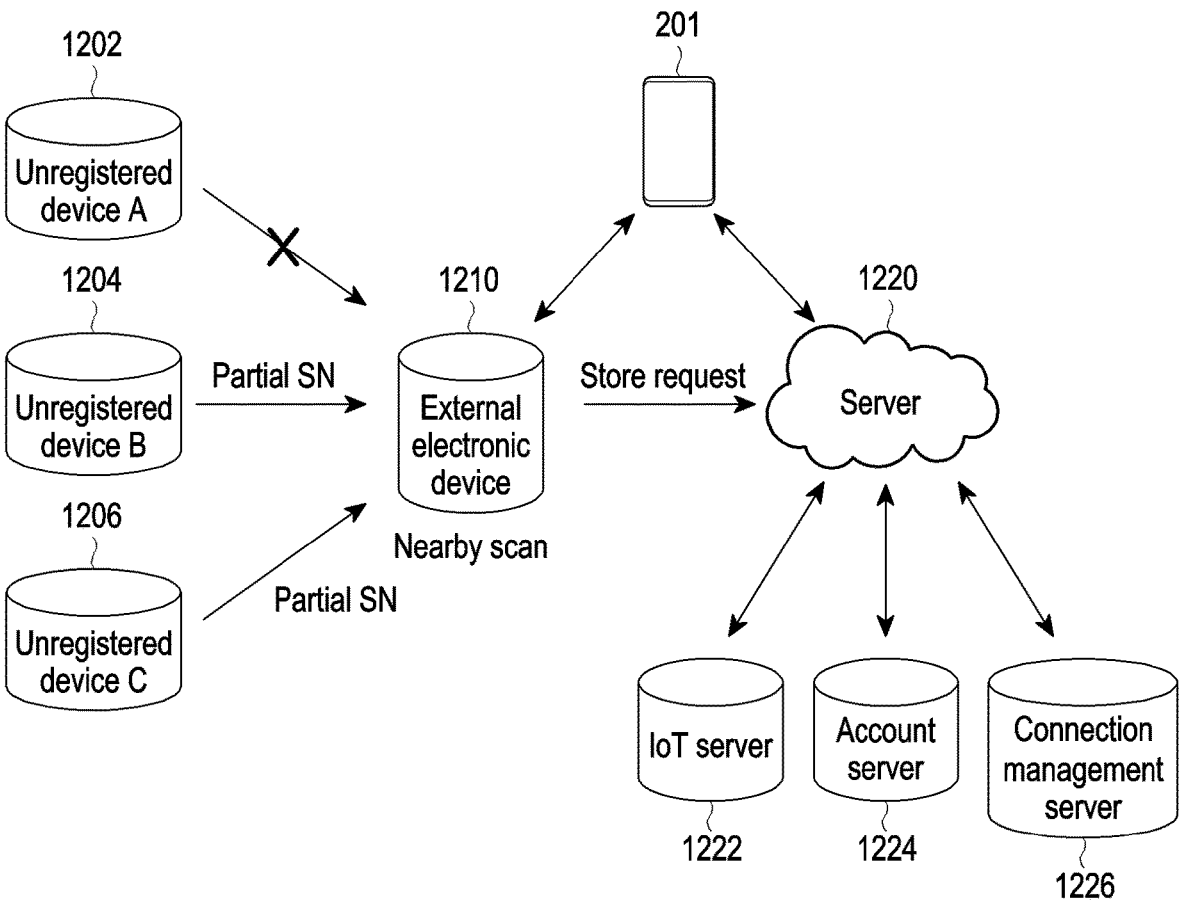
FIG. 12 illustrates a system architecture for providing an IoT service according to an embodiment of the disclosure.

FIG. 12 illustrates a system architecture for providing an IoT service according to an embodiment of the disclosure.

Referring to FIG. 12, a server 1220 (e.g., the server 310) may include at least one of an IoT server 1222 (e.g., an IoT cloud server or device registration server), an account server 1224, or a connection management server 1226 (e.g., a Wi-Fi locker server). The IoT server 1222 may store registration information (e.g., the registration information 470) of a pre-registered controlled device (e.g., an external electronic device 1210). The external electronic device 1210 having registration information stored in the IoT server 1222 may be referred to as a pre-registered device.

The external electronic device 1210 may be registered to the server 1220 (e.g., the IoT server 1222) by performing a registration procedure (e.g., FIG. 6 or 8) through the electronic device 201. The external electronic device 1210 may perform connection to the server 310 (e.g., the IoT server 1222) based on connection information received from the electronic device 201 according to at least one of the above-described embodiments (e.g., FIG. 6 or 7A, 7B, 7C, 7D, 7E, and 7F), and may transmit its own information (e.g., at least one of a user account, MAC address, serial number, or SSID) to the IoT server 1222 so as to allow the same to be stored in registration information. After being registered in the server 1220, the external electronic device 1210 may stop broadcasting a signal (e.g., a beacon signal or an advertising signal) to be discovered by a nearby device.

The account server 1224 may store and manage account information (e.g., account information 460) related to a user account. The account information may include device information (e.g., at least one of MAC address, serial number, or device type information (e.g., a model code and/or product type key)) of at least one pre-registered controlled device (e.g., the external electronic device 1210). The account information may include device information (e.g., MAC address, serial number, or device type information (e.g., a model code or product type key)) of a home appliance (e.g., at least one of an unregistered device A 1202, an unregistered device B 1204, or an unregistered device C 1206) having been purchased or acquired by transfer by the user and scheduled to be installed.

The connection management server 1226 may store connection information (e.g., AP information) and spatial information related to at least one pre-registered controlled device (e.g., the external electronic device 1210). The connection information may be related to a network to which the external electronic device 1210 is connected. When a user stores registration information (e.g., the registration information 470) of at least one controlled device (e.g., the controlled device 320) that can be used for the IoT control service through a registration procedure (e.g., operation 626 or 826), the IoT server 1222 may provide the connection information and spatial information of the controlled device 320 to the connection management server 1226 to be stored therein. The spatial information may include identification information (e.g., a device identification (ID) or MAC address) of the controlled device 320, and may indicate a location category (e.g., a house or company) of a place in which the controlled device 320 is installed and/or a room of a place in which the controlled device 320 is installed.

At least one unregistered device (e.g., the unregistered device A 1202, unregistered device B 1204, or unregistered device C 1206) may exist within a limited space (e.g., the network 300). In the case of not being registered to the server 1220 (e.g., the IoT server 1222), each unregistered device (e.g., unregistered device A 1202, unregistered device B 1204, or unregistered device C 1206) may periodically broadcast a signal (e.g., a beacon signal or advertising signal) including its own identification information (e.g., the identification information 472) so as to enable a nearby device (e.g., the external electronic device 1210 or electronic device 201) to perform discovery. The identification information 472 may include at least one of a MAC address, a network name, a partial serial number (SN), or device type information (e.g., a refrigerator, TV, or washing machine) associated with each unregistered device (e.g., the unregistered device A 1202, unregistered device B 1204, or unregistered device C 1206).

The account server 1224 may store device information (e.g., MAC address, serial number, or device type information (e.g., a model code or product type key) related to at least one unregistered device (e.g., the unregistered device A 1202, unregistered device B 1204, or unregistered device C 1206) under a user's consent. The account server 1224 may receive the device information related to at least one unregistered device (e.g., the unregistered device A 1202, unregistered device B 1204, unregistered device C 1206) from the user through an electronic device (e.g., the electronic device 201) and store the device information. The account server 1224 may receive device information related to at least one unregistered device (e.g., the unregistered device A 1202, unregistered device B 1204, or unregistered device C 1206) from an installation engineer or vendor, via a web service for example, and store the device information.

The external electronic device 1210 may discover one or more unregistered devices (e.g., the unregistered device A 1202, unregistered device B 1204, or unregistered device C 1206) by receiving, through a nearby scan, signals (e.g., beacon signals or advertising signals) broadcasted by one or more unregistered devices (e.g., the unregistered device A 1202, unregistered device B 1204, or unregistered device C 1206). The external electronic device 1210 may consider, based on the received signal strength (e.g., receive signal strength indicator (RSSI)) values of the received signals, at least one unregistered device (e.g., the unregistered device B

1204 or unregistered device C 1206) having the RSSI values exceeding a given threshold as having been discovered.

The external electronic device 1210 may acquire identification information 472 (e.g., at least one of an MAC address, partial serial number (SN), or device type information (e.g., a refrigerator, a TV, or a washing machine)) from a signal broadcast from the discovered unregistered device (e.g., the unregistered device B 1204 or unregistered device C 1206). For example, the full serial number is "XY123", and the partial serial number may include "123". The external electronic device 1210 may transmit the partial serial number and device type information to the server 1220 (e.g., the account server 1224) so as to be stored therein.

The external electronic device 1210 may perform a registration procedure for the discovered unregistered device (e.g., the unregistered device B 1204 or unregistered device C 1206) using the partial serial number and device type information. In an embodiment, the external electronic device 1210 may identify that the device information of the unregistered device is stored in the account server 1224 based on the partial serial number and/or device type information, while acquiring a full serial number of the unregistered device from the account server 1224 and performing the registration process using the full serial number.

Figure 13:
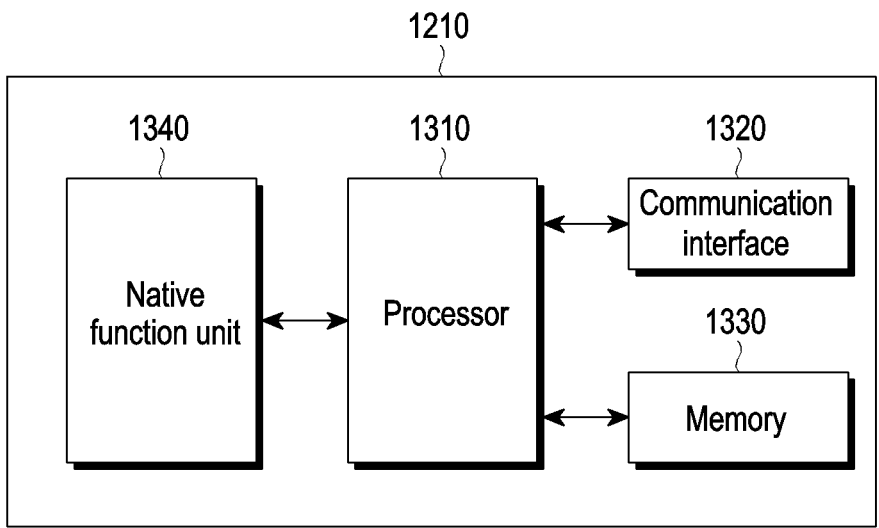
FIG. 13 is a block diagram illustrating a configuration of an external electronic device according to an embodiment of the disclosure.

FIG. 13 is a block diagram illustrating a configuration of an external electronic device according to an embodiment of the disclosure. In an embodiment, the external electronic device may include a pre-registered controlled device (e.g., the external electronic device 1210).

Referring to FIG. 13, an external electronic device 1210 includes a processor 1310 including a processing circuit, a communication interface 1320 including a communication circuit, a memory 1330, and a native function unit 1340. The native function unit 1340 may perform native functions (e.g., a television function, a refrigerator function, or a washing machine function) of the external electronic device 1210 under the control of the processor 1310. The processor 1310 may communicate with the electronic device 201, the server 1220 (e.g., at least one of the IoT server 1222, the account server 1224, or the connection management server 1226), and/or at least one unregistered controlled device (e.g., at least one of unregistered device A 1202, unregistered device B 1204, or unregistered device C 1206) through the communication interface 1320. The communication interface 1320 may communicate with the electronic device 201 and/or at least one unregistered controlled device (e.g., at least one of unregistered device A 1202, unregistered device B 1204, or unregistered device C 1206) by using a communication method (e.g., the first network 298) such as at least one of Bluetooth, Wi-Fi, Wi-Fi direct, Z-wave, Zig-bee, or IrDa. The communication interface 1320 may communicate with the server 1220 (e.g., at least one of the IoT server 1222, account server 1224, or connection management server 1226) by using a communication method (e.g., the second network 299) such as at least one of Wi-Fi or a cellular network.

The processor 1310 may be configured to transmit a signal (e.g., a beacon signal or an advertising signal) through the communication interface 1320 when the external electronic device 1210 communicates with the electronic device 201 for the first time after power-on or booting, so as to enable the electronic device 201 to discover the external electronic device and register the same to the server 1220 (e.g., at least one of the IoT server 1222, the account server 1224, or the connection management server 1226). The processor 1310 may be configured to store, in the memory 1330, connection information (e.g., AP information) for connection with the server 1220 (e.g., at least one of the IoT server 1222, the account server 1224, and the connection management server 1226). The processor 1310 may be configured to store, in the memory 1330, its own spatial information having been recognized during the registration procedure for the server 1220 (e.g., at least one of the IoT server 1222, the account server 1224, or the connection management server 1226). The processor 1310 may directly receive the spatial information from a user or receive the spatial information from the electronic device 201 through the communication interface 1320.

The processor 1310 may be configured to discover at least one unregistered controlled device (e.g., at least one of the unregistered device A 1202, unregistered device B 1204, or unregistered device C 1206) through the communication interface 1320. The processor 1310 may derive a registration procedure for the server 1220 by transmitting, through the communication interface 1320, connection information for connection with the server 1220 and its own spatial information to the discovered at least one unregistered controlled device (e.g., at least one of the unregistered device A 1202, unregistered device B 1204, or unregistered device C 1206).

Figure 14:
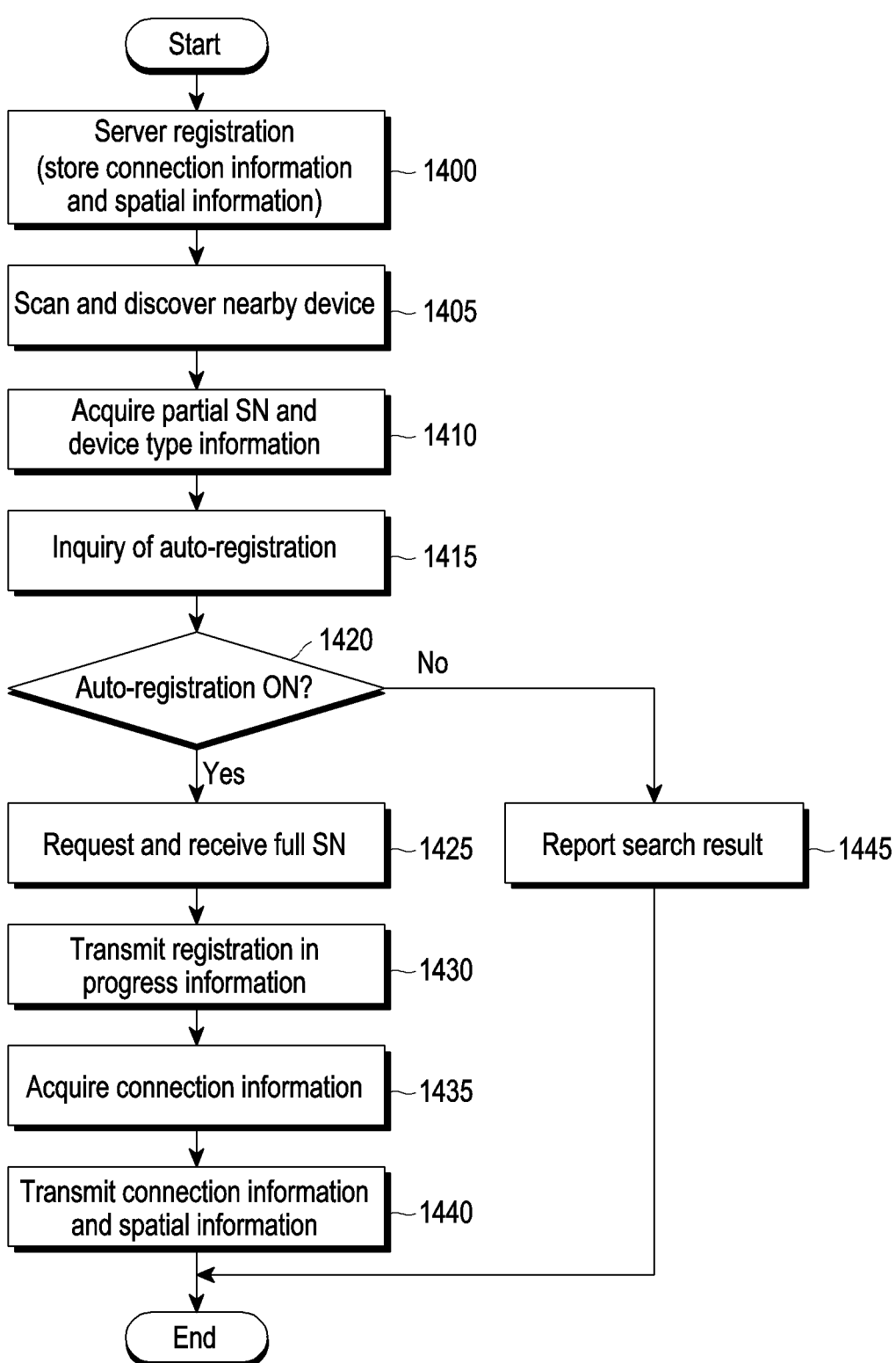
FIG. 14 is a flowchart illustrating a registration procedure for an unregistered device according to an embodiment of the disclosure.

FIG. 14 is a flowchart illustrating a registration procedure for an unregistered device according to an embodiment of the disclosure.

Referring to FIG. 14, at least one of the operations described below may be executed by a processor (e.g., the processor 1310) of an external electronic device (e.g., the external electronic device 1210). The embodiment shown in FIG. 14 is only an example, and an operation sequence according to embodiments disclosed in this document may be different from that shown in FIG. 14. Further, some operations shown in FIG. 14 may be omitted, sequence between operations may be changed, or operations may be merged.

Referring to FIG. 14, in operation 1400, the external electronic device 1210 (e.g., the processor 1310) may be registered in a server 1220 (e.g., at least one of the IoT server 1222, account server 1224, or connection management server 1226). The external electronic device 1210 (e.g., the processor 1310) may perform connection to the server 1220 through a user input or by using connection information received from the electronic device 201, and may transmit information related to registration (e.g., at least one of a user account, a MAC address, a full serial number, device type information, or connection information) to the server 1220 to be stored therein. After being registered to the server 1220, the external electronic device 1210 may perform a native function in response to a control command remotely received from the server 1220.

After the registration procedure is completed, the IoT server 1220 may associate registration information (e.g., at least one of a MAC address, a full serial number, or device type information) of the external electronic device 1210 with a user account of the external electronic device 1210 and store the same. The connection management server 1226 may associate connection information (e.g., AP information) and/or spatial information of the external electronic device 1210 with a user account of the external electronic device 1210 after the registration procedure is completed. After being registered in the server 1220, the external electronic device 1210 (e.g., the processor 1310) may store connection information (e.g., AP information) and/or spatial information in the memory (e.g., the memory 1330). The spatial information may include a location category of a place in which the external electronic device 1210 is installed (e.g., a location ID representing a home or a company) and/or a room (e.g., a room ID) in which the external electronic device 320 is installed.

In operation 1405, the external electronic device 1210 (e.g., the processor 1310) may discover the unregistered device 1204 by receiving, through a nearby scan, a signal (e.g., a beacon signal or advertising signal) transmitted by at least one unregistered device (e.g., the unregistered device 1204). The external electronic device 1210 (e.g., the processor 1310) may perform a nearby scan on a channel using at least one of Wi-Fi, BLE, or thread. The external electronic device 1210 (e.g., the processor 1310) may perform a nearby scan on at least one channel (e.g., a channel using at least one of Wi-Fi, BLE, or thread) designated according to a user input or a manufacturer setting.

The external electronic device 1210 (e.g., the processor 1310) may perform a nearby scan at each time point (e.g., at a periodic time point or at a non-periodic time point) designated according to a user input or a manufacturer setting. The external electronic device 1210 (e.g., the processor 1310) may perform a nearby scan during a time interval designated by a user. The external electronic device 1210 (e.g., the processor 1310) may perform a nearby scan at each designated time point during a designated period of time according to a search command from the server 1220 (e.g., the account server 1224). The server 1220 (e.g., the account server 1224) may transmit a search command for a nearby scan to the external electronic device 1210 after device information of the unregistered device (e.g., the unregistered device 1204) is input. The search command may indicate a designated time and/or time interval to perform a nearby scan.

The external electronic device 1210 (e.g., the processor 1310) may consider that the unregistered device 1204 has been discovered when the RSSI of the signal received from the unregistered device 1204 exceeds a designated threshold value. The external electronic device 1210 (e.g., the processor 1310) may configure the threshold to be a value higher than that used for device discovery in normal Bluetooth communication in order to increase the reliability associated with the fact that the unregistered device 1204 exists in substantially the same space (e.g., a house or room) as that of the external electronic device 1210 and/or that the user owns the unregistered device 1204. Accordingly, it is possible to prevent an unregistered device not owned by the user from being searched in a nearby environment other than the same space as that of the external electronic device 1210.

In operation 1410, the external electronic device 1210 (e.g., the processor 1310) may acquire identification information (e.g., at least one of MAC address, partial serial number (SN), or device type information) of the unregistered device 1204 included in the received signal. The device type information may include a model code or product type key.

In operation 1415, the external electronic device 1210 (e.g., the processor 1310) may identify whether an auto-registration function is activated (e.g., ON or enabled) for the server 1220 (e.g., the IoT server 1222) in order to determine whether to perform a background registration procedure of the discovered unregistered device 1204. The external electronic device 1210 (e.g., the processor 1310) may transmit an inquiry signal to the server 1220 to inquire whether auto-registration is enabled, and may receive a response signal indicating auto-registration enabled or auto-registration disabled from the server 1220. The response signal may include information indicating whether auto-registration of a random unregistered device is permitted, based on a user account corresponding to the external electronic device 1210. According to an embodiment of the disclosure, the information may be specific to the external electronic device 1210.

The server 1220 may store information indicating whether auto-registration of a random unregistered device by the external electronic device 1210 is permitted (e.g., auto-registration is enabled), based on a user account corresponding to the external electronic device 1210. The server 1220 may receive the information from the electronic device 201. When the external electronic device 1210 is registered, the electronic device 201 may configure the information based on a user input and transmit the information to the server 1220. When the external electronic device 1210 is registered, the electronic device 201 may display a screen asking the user whether to use auto-registration through the external electronic device 1210, and when a user input for activating auto-registration is received through the screen, the electronic device may transmit information indicating the activation of auto-registration through the external electronic device 1210 to the server 1220 to be stored therein.

In operation 1420, the external electronic device 1210 (e.g., the processor 1310) may determine whether auto-registration is enabled, based on the signal received from the server 1220, and if not, may proceed to operation 1445. In operation 1445, the external electronic device 1210 (e.g., the processor 1310) may transmit a search result indicating that the unregistered device 1204 has been discovered by the external electronic device 1210 to the server 1220 (e.g., the account server 1224). On the other hand, when auto-registration is enabled, operation 1425 may be performed. According to an embodiment of the disclosure, the auto-registration function of the external electronic device 1210 may always be enabled, in which case operations 1415 and 1420 may be omitted.

In operation 1425, the external electronic device 1210 (e.g., the processor 1310) may request confirm data (e.g., a full serial number) of the unregistered device 1204 from the server 1220 (e.g., the account server 1224) based on at least one of the partial serial number and device type information obtained in operation 1410, and may receive the full serial number from the server 1220. When the external electronic device 1210 (e.g., the processor 1310) does not receive the full serial number from the server 1220 (e.g., when receiving a response signal indicating that the full serial number corresponding to the partial serial number is not stored from the server 1220), the external electronic device 1210 (e.g., the processor 1310) may transmit a search result indicating that the unregistered device 1204 has been discovered (e.g., a search result of operation 1612) to the server 1220 (e.g., the account server 1224) and complete the procedure.

In operation 1430, the external electronic device 1210 (e.g., the processor 1310) may transmit information notifying that a registration procedure for the unregistered device 1204 is in progress (e.g., registration in progress information) to the server 1220 (e.g., the account server 1224) in order to prevent the registration process for the unregistered device 1204 from being duplicately performed by a random pre-registered device. According to an embodiment of the disclosure, operation 1430 may be omitted, or may be merged with the request signal of operation 1425. For example, upon receiving the request signal of operation 1425, the server 1220 may store information indicating that the registration procedure of the unregistered device 1204 is in progress.

In operation 1435, the external electronic device 1210 (e.g., the processor 1310) may obtain connection information (e.g., AP information) used for the unregistered device 1204 to connect to the server 1220. The external electronic device 1210 (e.g., the processor 1310) may transmit a request signal for requesting connection information for the unregistered device 1204 to the server 1220 (e.g., the connection management server 1226), and may receive the connection information from the connection management server 1226. The connection information may be substantially the same as that used for the external electronic device 1210 to connect to the server 1220. The external electronic device 1210 may store the connection information in the memory 1330 when connecting to the server 1220 through a registration procedure, and may acquire the connection information from the memory 1330 without requesting to the server 1220.

In operation 1440, the external electronic device 1210 (e.g., the processor 1310) may transmit the connection information and spatial information of the external electronic device 1210 to the unregistered device 1204. The external electronic device 1210 (e.g., the processor 1310) may establish a D2D connection (e.g., Bluetooth connection or Wi-Fi connection) with the unregistered device 1204 based on the signal received in operation 1405, and may transmit the connection information to the unregistered device 1204 through the D2D connection. The connection information may be used for the unregistered device 1204 to connect to the server 1220 and perform a registration procedure.

Figure 15:
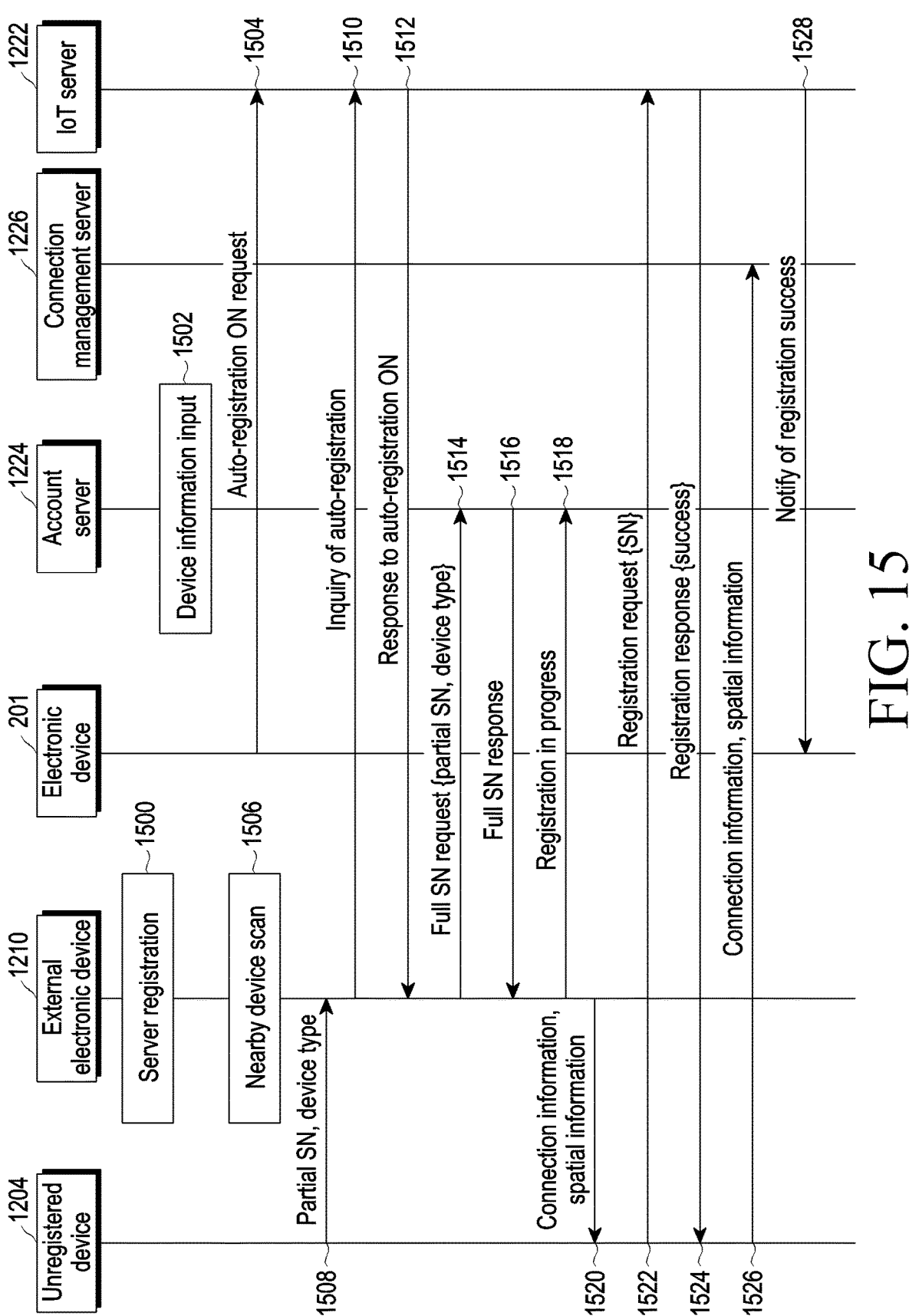
FIG. 15 is a signal flow diagram illustrating an example of a registration procedure for an unregistered device according to an embodiment of the disclosure.

FIG. 15 is a signal flow diagram illustrating an example of a registration procedure for an unregistered device according to an embodiment of the disclosure. At least one of the operations described below may be executed by the processor 1310 of an external electronic device (e.g., the external electronic device 1210). According to embodiments, at least one of the operations described below may be omitted, modified, or the sequence may be changed.

Referring to FIG. 15, in operation 1500, the external electronic device 1210 (e.g., the processor 1310) may perform a registration procedure (e.g., FIG. 6 or 8) and thus be registered in the server 1220 (e.g., at least one of the IoT server 1222, the account server 1224, or the connection management server 1226) as in operation 1400 for example. After being registered, the external electronic device 1210 (e.g., the processor 1310) may store connection information used for connection with the server 1220 in the memory 1330.

In operation 1502, the server 1220 (e.g., the account server 1224) may receive an input of device information of an unregistered device (e.g., the unregistered device 1204) from a user, an installation engineer, or a seller, and may store the input device information in association with a user account of the external electronic device 1210. The device information of the unregistered device 1204 may include at least one of a MAC address, a serial number, and device type information. In an embodiment, the device type information may include a model code or product type key. Operation 1502 may be performed at least prior to operation 1514. When the device information of the unregistered device 1204 is input, the account server 1224 may transmit a search command to at least one of the external electronic device 1210 or the electronic device 201 corresponding to the user account to instruct perform a nearby scan.

In operation 1504, the server 1220 (e.g., the IoT server 1222) may receive a request signal for activating an auto-registration function for a user account from the electronic device 201. When the external electronic device 1210 is registered, the electronic device 201 may transmit the request signal to the IoT server 1222 to activate an auto-registration function for the user account to which the external electronic device 1210 is registered. The request signal may allow the external electronic device 1210 to automatically register a random unregistered device. The request signal may allow auto-registration of a random unregistered device to the user account through a random pre-registered device. The request signal may be received from a user through a web service. The IoT server 1222 may store information for activating an auto-registration function for a user account in response to the request signal. In an embodiment, operation 1504 may be performed at least prior to operation 1510.

In operation 1506, the external electronic device 1210 (e.g., the processor 1310) may perform a nearby scan. In operation 1508, the external electronic device 1210 (e.g., the processor 1310) may receive a signal (e.g., a beacon signal or an advertising signal) transmitted from the unregistered device 1204 through the nearby scan, thereby discovering the unregistered device 1204 While the unregistered device 1204 is not registered to the server 1220, the unregistered device 1204 may repeatedly broadcast a signal including its own partial serial number and/or device type information of the unregistered device at a designated time point (e.g., periodic time point or aperiodic time point) in a given manner (e.g., transmission time point and/or transmission format).

The external electronic device 1210 (e.g., the processor 1310) may determine that the unregistered device 1204 has been discovered in case that the beacon signal received through a nearby scan is identified to include an SSID of a designated value, or the advertising signal received through the nearby scan has a designated transmission format. The external electronic device 1210 (e.g., the processor 1310) may determine that the unregistered device 1204 has been discovered in case that a signal transmitted from the unregistered device 1204 has RSSI exceeding a designated threshold value in order to increase reliability of ownership of the unregistered device 1204. The designated threshold value may be configured to be a value higher than that used for device discovery in normal Bluetooth communication.

In operation 1510, the external electronic device 1210 (e.g., the processor 1310) may transmit, to the server 1220 (e.g., the IoT server 1222), an inquiry signal for inquiring whether auto-registration is enabled in order to determine whether to automatically register the unregistered device 1204. In operation 1512, the server 1222 may identify that auto-registration is enabled for the external electronic device 1210 or a user account corresponding to the external electronic device 1210, and may transmit a response signal instructing activation of auto-registration to the external electronic device 1210.

In operation 1514, the external electronic device 1210 (e.g., the processor 1310) may transmit a request signal for requesting confirm data (e.g., a full serial number) of the unregistered device 1204 to the server 1220 (e.g., the account server 1224) in order to automatically register the unregistered device 1204. The request signal may include, for example, identification information obtained in operation 1508 (e.g., at least one of a MAC address, a partial serial number, or device type information). The account server 1224 may obtain confirm data (e.g., a full serial number) by searching for device information input in operation 1502 based on the identification information. In operation 1516, the external electronic device 1210 (e.g., the processor 1310) may receive a response signal including the confirm data (e.g., the full serial number) from the account server 1224.

The external electronic device 1210 (e.g., the processor 1310) may identify that the unregistered device 1204 is owned by the user by receiving the response signal.

Although not shown, according to an embodiment of the disclosure, when the account server 1224 does not store the confirm data of the unregistered device 1204, the account server 1224 may transmit a failure response signal to the external electronic device 1210. The external electronic device 1210 may stop the registration procedure in response to the failure response signal. The external electronic device 1210 may transmit, to the account server 1224, a search result indicating that the unregistered device 1204 has been discovered by the external electronic device 1210 (e.g., a search result of operation 1612) in response to the failure response signal, and may omit subsequent operations (e.g., operations 1518 and 1520).

In operation 1518, the external electronic device 1210 (e.g., the processor 1310) may transmit information notifying that the registration procedure of the unregistered device 1204 is in progress (e.g., registration in progress information) to the server 1220 (e.g., the account server 1224). According to an embodiment of the disclosure, operation 1518 may be omitted, or may be merged with the request signal of operation 1514. The account server 1224 may store information indicating that the registration procedure of the unregistered device 1204 is in progress when receiving the registration in progress information.

After having received the request signal of operation 1514 or the registration in progress information of operation 1518, the account server 1224 may identify that information has been stored, the information indicating that a registration procedure for the unregistered device 1204 is being progressed by another external electronic device (e.g., the electronic device 201 or other external electronic device (not shown)). When a registration procedure for the unregistered device 1204 is already in progress by another external electronic device, the account server 1224 may transmit a registration stop signal to the external electronic device 1210, and the external electronic device 1210 (e.g., the processor 1310) may be configured not to execute a subsequent operation (e.g., operation 1520) in response to the registration stop signal.

In operation 1520, the external electronic device 1210 (e.g., the processor 1310) may transmit connection information (e.g., AP information) used for the unregistered device 1204 to connect to the server 1220 to the unregistered device 1204. In an embodiment, the connection information may be substantially the same as that used for the external electronic device 1210 to connect to the server 1220.

Although not shown, according to an embodiment of the disclosure, the external electronic device 1210 (e.g., the processor 1310) may request and obtain the connection information from the server 1220 (e.g., the connection management server 1226). The external electronic device 1210 (e.g., the processor 1310) may transmit its own spatial information together with the connection information to the unregistered device 1204. The external electronic device 1210 (e.g., the processor 1310) may establish a D2D connection (e.g., Bluetooth connection or Wi-Fi connection) with the unregistered device 1204 based on the signal received in operation 1508, and may transmit the connection information and/or spatial information to the unregistered device 1204 through the D2D connection.

In operation 1522, the unregistered device 1204 may perform connection to an AP (not shown) indicated by the AP information by using the connection information, may establish a D2D connection to the server 1220 (e.g., the IoT server 1222) through the AP, and may transmit a registration request message to the IoT server 1222 through the D2D connection. The registration request message may include at least one of identification information (e.g., MAC address), confirm data (e.g., serial number), or spatial information of the unregistered device 1204. The unregistered device 1204 may include the spatial information, having been received in operation 1520, in the registration request message. The IoT server 1222 may identify that the unregistered device 1204 exists in substantially the same space as that of the pre-registered external electronic device 1210 by using the spatial information included in the registration request message, and may allow registration of the unregistered device 1204. Accordingly, at least one operation for confirming the unregistered device 1204 in the IoT server 1222 may be omitted.

In operation 1524, the IoT server 1222 may register the unregistered device 1204 (e.g., store registration information) in response to the registration request message, and then may transmit a registration response message indicating that the registration of the unregistered device 1204 has been completed to the unregistered device 1204. In operation 1526, the unregistered device 1204 may transmit its own connection information and spatial information to the server 1220 (e.g., the connection management server 1226) in response to recognizing that registration has been completed. In operation 1528, the IoT server 1222 may transmit a registration response message notifying that the registration of the unregistered device 1204 has been completed to the electronic device 201.

Figure 16:
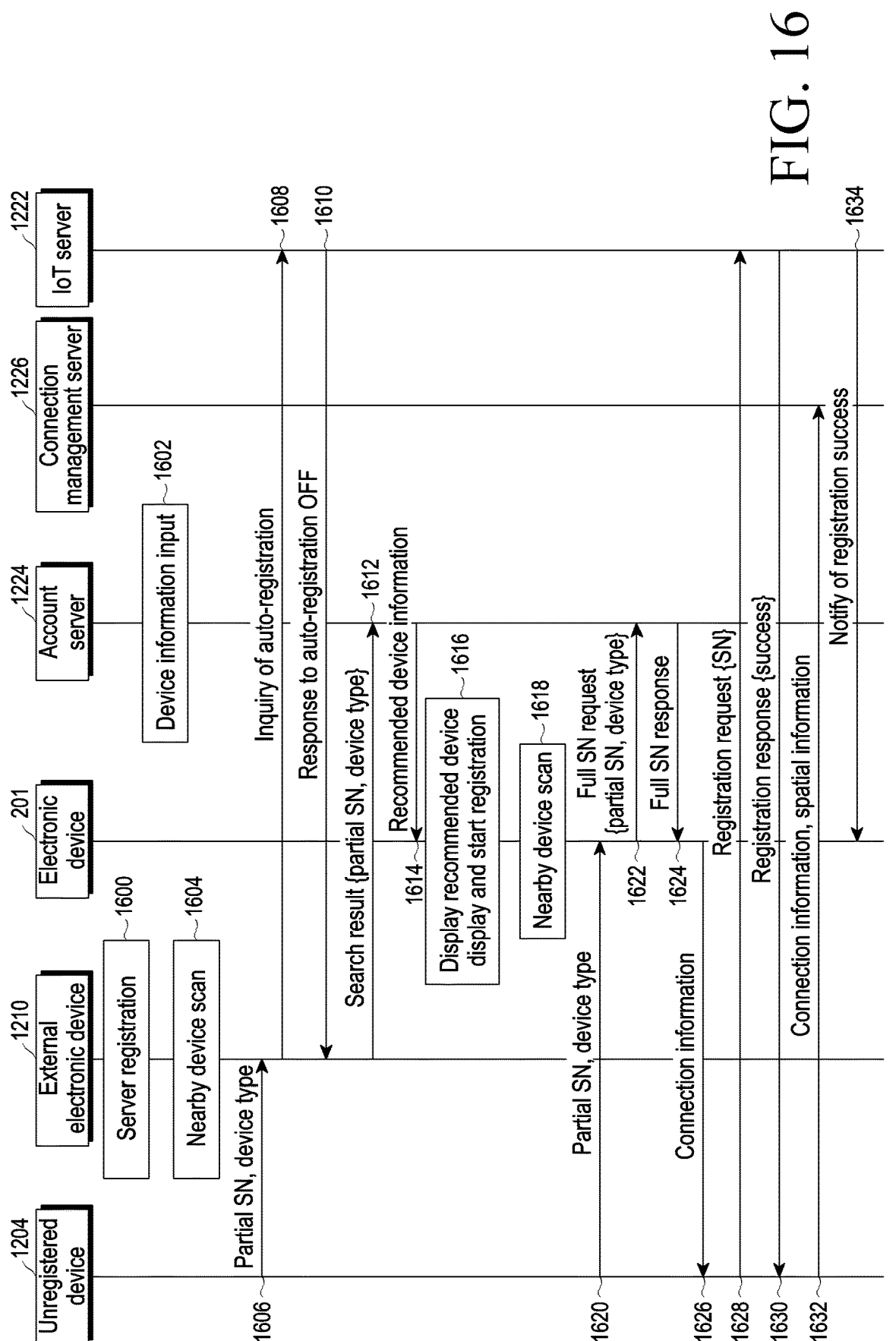
FIG. 16 is a signal flow diagram illustrating an example of a registration procedure for an unregistered device according to an embodiment of the disclosure.

FIG. 16 is a signal flow diagram illustrating an example of a registration procedure for an unregistered device according to an embodiment of the disclosure. At least one of the operations described below may be executed by the processor 1310 of an external electronic device (e.g., the external electronic device 1210) or the processor 220 of an electronic device (e.g., the electronic device 201). According to embodiments, at least one of the operations described below may be omitted, modified, or the sequence may be changed.

Referring to FIG. 16, in operation 1600, the external electronic device 1210 (e.g., the processor 1310) may perform a registration procedure (e.g., FIG. 6 or 8) and thus be registered in the server 1220 (e.g., at least one of the IoT server 1222, the account server 1224, or the connection management server 1226) as in operation 1400 for example. After being registered, the external electronic device 1210 (e.g., the processor 1310) may store connection information used for connection with the server 1220 in the memory 1330.

In operation 1602, the server 1220 (e.g., the account server 1224) may receive an input of device information of an unregistered device (e.g., the unregistered device 1204) from a user, an installation engineer, or a seller, and may store the input device information in association with a user account of the external electronic device 1210. When the device information of the unregistered device 1204 is input, the account server 1224 may transmit a search command to at least one of the external electronic device 1210 or the electronic device 201 corresponding to the user account to instruct perform a nearby scan.

In operation 1604, the external electronic device 1210 (e.g., the processor 1310) may perform a nearby scan. In operation 1606, the external electronic device 1210 (e.g., the processor 1310) may receive a signal (e.g., an advertising signal) transmitted from the unregistered device 1204 through the nearby scan, thereby discovering the unregistered device 1204. The external electronic device 1210 (for example, the processor 1310) may acquire a partial serial number and/or device type information of the unregistered device 1204 from the advertising signal.

In operation 1608, the external electronic device 1210 (e.g., the processor 1310) may transmit, to the server 1220 (e.g., the IoT server 1222), an inquiry signal for inquiring whether auto-registration is enabled in order to determine whether to automatically register the unregistered device 1204. In operation 1610, the IoT server 1222 may identify that auto-registration is not enabled for the external electronic device 1210 or a user account corresponding to the external electronic device 1210, and may transmit a response signal instructing disabling auto-registration to the external electronic device 1210. The IoT server 1222 may determine that auto-registration for the user account or the external electronic device 1210 is disabled in case that a request signal for activating an auto-registration function (e.g., the request signal in operation 1504) has never been received, or a request signal for disabling the auto-registration function has been previously received.

In operation 1612, the external electronic device 1210 (e.g., the processor 1310) may transmit a search result indicating that the unregistered device 1204 has been discovered by the external electronic device 1210 according to the response signal to the server 1220 (e.g., the account server 1224). The search result may include at least one of identification information (e.g., MAC address) of the external electronic device 1210, a user account, or identification information (e.g., at least one of MAC address, partial serial number, or device type information) of the unregistered device 1204. The search result may further include spatial information of the external electronic device 1210. The search result may further include the received signal strength (e.g., RSSI) of the unregistered device 1204 measured by the external electronic device 1210.

The external electronic device 1210 (e.g., the processor 1310) may include, after reporting the search result, the identification information (e.g., at least one of MAC address, partial serial number, or device type information) of the unregistered device 1204 in a black list for a designated period of time (e.g., 1 day or 7 days) to prevent frequent transmission of the search result. The designated period may be configured by a user or manufacturer. In an embodiment, when it is identified that the identification information of the unregistered device 1204, having been discovered in operation 1508, is included in the black list, the external electronic device 1210 (e.g., the processor 1310) may be configured not to report the search result to the server 1224.

In operation 1614, the account server 1224 may store the search result and transmit recommended device information based on the search result to the electronic device 201. The recommended device information may include at least a search result of the unregistered device 1204. The recommended device information may include a search result (e.g., identification information (e.g., MAC address) of the external electronic device 1210) of one or more unregistered devices including the unregistered device 1204, a user account, or identification information (e.g., at least one of MAC address, partial serial number, or device type information) of the unregistered device 1204. The unregistered device 1204 may be discovered by one or more external electronic devices (e.g., including the external electronic device 1210) and reported to the account server 1224. The account server 1224 may include, in the recommended device information, together with the unregistered device 1204, the one or more external electronic devices that have discovered the unregistered device 1204.

Figure 17:
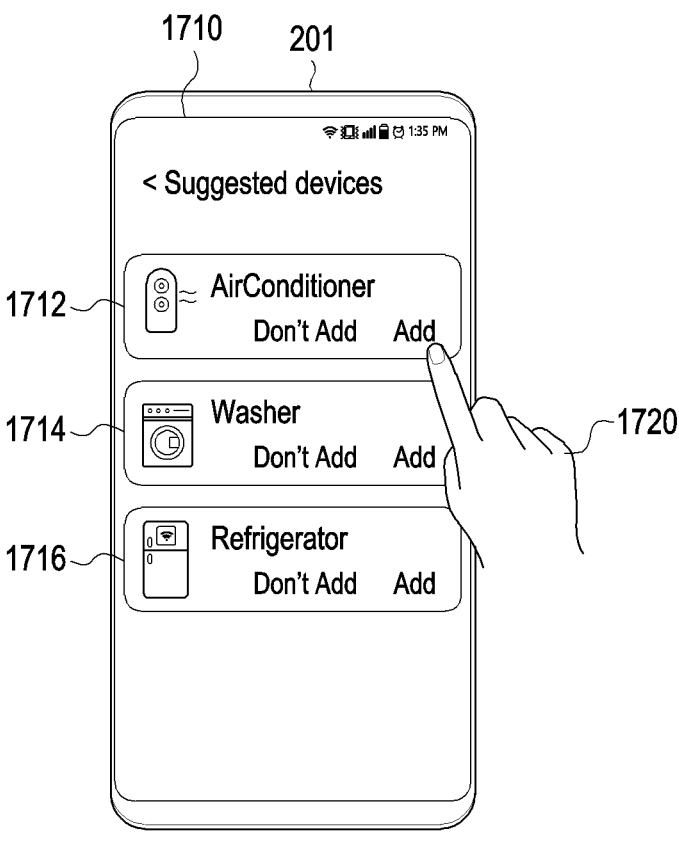
FIG. 17 illustrates an example of a user interface including a recommended device list according to an embodiment of the disclosure.
Figures 18A, 18B:
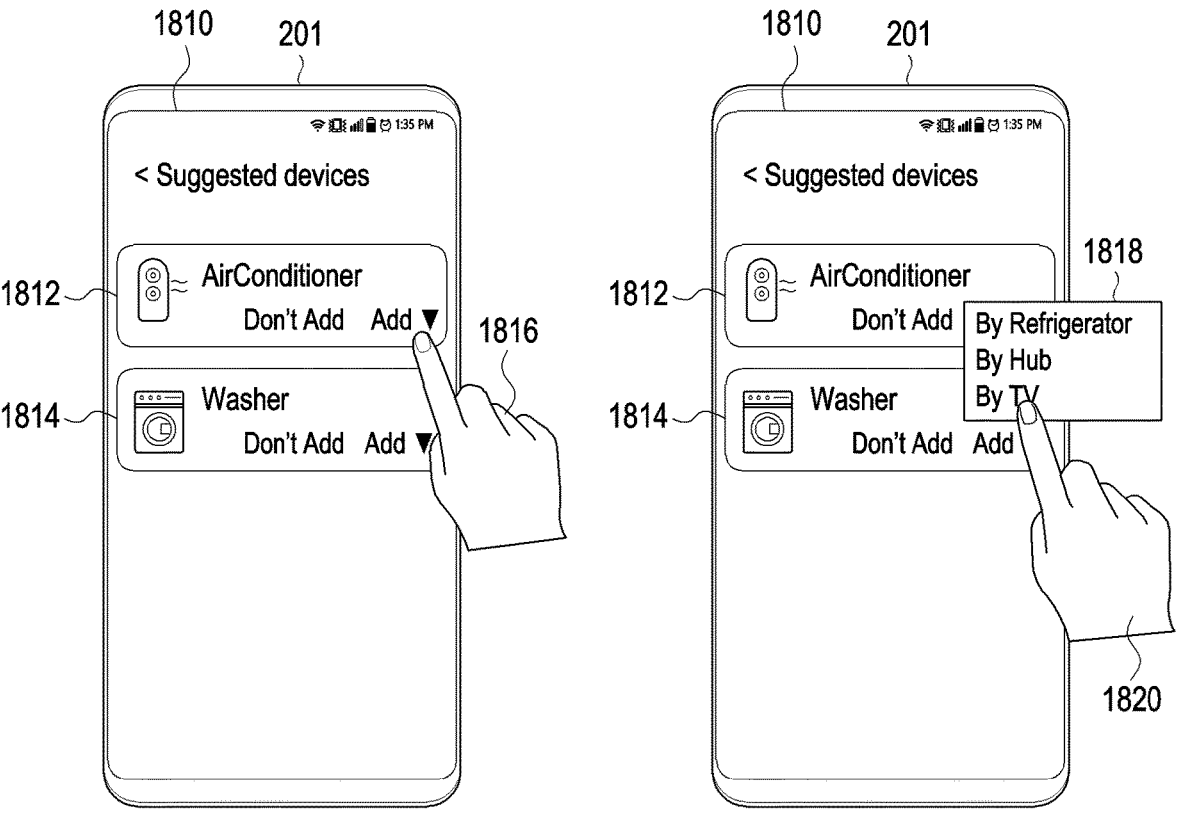
FIGS. 18A and 18B illustrate examples of a user interface including a recommended device list according to various embodiments of the disclosure.

In operation 1616, the electronic device 201 (e.g., the processor 220) may display a recommended device list including the unregistered device 1204 discovered by the external electronic device 1210 (e.g., a recommended device list 1710 of FIG. 17 or a recommended device list 1810 of FIG. 18A) in response to the recommended device information, and may proceed operation 1618 to perform a registration procedure for the unregistered device 1204 according to a user input through the recommended device list (e.g., a user input 1720 of FIG. 17 or a user input of FIG. 18A). The recommended device list may include at least one unregistered device (e.g., the unregistered device 1204) for which device information is input to a user account and having been discovered by another external electronic device (e.g., the external electronic device 1210 or the electronic device 201). The recommended device list may include one or more external electronic devices (e.g., including the external electronic device 1210) that have discovered the unregistered device 1204.

In operation 1618, the electronic device 201 (e.g., the processor 220) may perform a nearby scan to identify that the unregistered device 1204 is nearby. According to an embodiment of the disclosure, operation 1618 may be omitted. In operation 1620, the electronic device 201 (e.g., the processor 220) may receive a signal (e.g., a beacon signal or an advertising signal) broadcast from the unregistered device 1204, and may acquire identification information (e.g., MAC address, partial serial number, and/or device type information) of the unregistered device 1204 from the signal. The electronic device 201 (e.g., the processor 220) may proceed to operation 1622 to perform a registration procedure of the unregistered device 1204 in case that the identification information obtained in operation 1620 is substantially the same as that included in the search result transmitted in operation 1614.

In operation 1622, the electronic device 201 (e.g., the processor 220) may transmit a request signal for requesting confirm data (e.g., full serial number) of the unregistered device 1204 to the server 1220 (e.g., the account server 1224) so as to perform auto-registration for the unregistered device 1204. The request signal may include, for example, identification information obtained in operation 1620 (e.g., at least one of a MAC address, a partial serial number, and device type information). In operation 1624, the electronic device 201 (e.g., the processor 220) may receive a response signal including the confirm data (e.g., the full serial number) from the account server 1224. The response signal may include the full serial number and/or device type information of the unregistered device 1204. The response signal may include identification information (e.g., MAC address) and/or spatial information of the external electronic device 1210.

In operation 1626, the electronic device 201 (e.g., the processor 220) may transmit connection information (e.g., AP information) used for the unregistered device 1204 to connect to the server 1220 to the unregistered device 1204. The connection information may be substantially the same as that used for the electronic device 201 to connect to the server 1220. The electronic device 201 (e.g., the processor 220) may generate the connection information to include an AP selected according to a user input.

Although not shown, according to an embodiment of the disclosure, the electronic device 201 (e.g., the processor 220) may request and obtain the connection information from the server 1220 (e.g., the connection management server 1226). The electronic device 201 (e.g., the processor 220) may transmit the spatial information of the external electronic device 1210 obtained in operation 1614 or operation 1624 together with the connection information to the unregistered device 1204. The external electronic device 1210 (e.g., the processor 1310) may establish a D2D connection (e.g., Bluetooth connection or Wi-Fi connection) with the unregistered device 1204 based on the signal received in operation 1606, and may transmit the connection information and/or spatial information to the unregistered device 1204 through the D2D connection.

In operation 1628, the unregistered device 1204 may perform connection to an AP (not shown) indicated by the AP information by using the connection information, may establish a D2D connection to the server 1220 (e.g., the IoT server 1222) through the AP, and may transmit a registration request message to the IoT server 1222 through the D2D connection. The registration request message may include at least one of identification information (e.g., MAC address), confirm data (e.g., serial number), or spatial information of the unregistered device 1204. The unregistered device 1204 may include the spatial information, having been received in operation 1626, in the registration request message. The server 1222 may identify that the unregistered device 1204 exists in substantially the same space as that of the pre-registered external electronic device 1210 by using the spatial information included in the registration request message, and may allow registration of the unregistered device 1204. Accordingly, at least one operation for confirming the unregistered device 1204 in the IoT server 1222 may be omitted.

In operation 1630, the IoT server 1222 may register the unregistered device 1204 (e.g., store registration information) in response to the registration request message, and then may transmit a registration response message indicating that the registration of the unregistered device 1204 has been completed to the unregistered device 1204. In operation 1632, the unregistered device 1204 may transmit its own connection information and spatial information to the server 1220 (e.g., the connection management server 1226) in response to recognizing that registration has been completed. In operation 1634, the IoT server 1222 may transmit a registration response message notifying that the registration of the unregistered device 1204 has been completed to the electronic device 201.

The electronic device 201 may be located in a different space (e.g., outside) from the unregistered device 1204 and/or the external electronic device 1210, and may request to proceed with the registration procedure of the unregistered device 1204 from the external electronic device 1210 through the server 1220 (e.g., the IoT server 1222) instead of directly transmitting the connection information to the unregistered device 1204 in operation 1626. In an embodiment, the external electronic device 1210 may receive a signal requesting to proceed with the registration procedure of the unregistered device 1204 through the IoT server 1222 and may proceed, for example, to operation 1514.

FIG. 17 illustrates an example of a user interface including a recommended device list according to an embodiment of the disclosure.

Referring to FIG. 17, the electronic device 201 may display a recommended device list 1710 based on recommended device information received from the server 1220 (e.g., the account server 1224). The recommended device list 1710 may indicate at least one unregistered device (e.g., the unregistered device 1204) discovered by an external electronic device (e.g., the external electronic device 1210) and reported to the account server 1224 through a search result. For example, the recommended device list 1710 may include at least one of an air conditioner item 1712, a washing machine item 1714, and a refrigerator item 1716. At least one of the air conditioner item 1712, the washing machine item 1714, or the refrigerator item 1716 may include a "Don't Add" button (e.g., a display object) and an "Add" button. For example, when a user input 1720 (e.g., a touch) is received through the "Add" button of the air conditioner item 1712, the electronic device 201 may proceed to operation 1618 to proceed with a registration procedure of the air conditioner.

FIGS. 18A and 18B illustrate examples of user interfaces including a list of recommended devices according to various embodiments of the disclosure.

Referring to FIG. 18A, the electronic device 201 may display a recommended device list 1810 based on recommended device information received from the server 1220 (e.g., the account server 1224). The recommended device list 1810 includes at least one unregistered device (e.g., the unregistered device 1204) discovered by an external electronic device (e.g., the external electronic device 1210) and reported to the account server 1224 through a search result. For example, the recommended device list 1810 may include at least one of an air conditioner item 1812 or a washing machine item 1814. At least one of the air conditioner item 1812 or the washing machine item 1814 may include a "Don't Add" button and an "Add" button.

In case that a user input 1816 (e.g., a touch) is received, e.g., via the "Add" button of the air conditioner item 1812, and that the air conditioner is discovered by one or more external electronics (e.g., including the external electronic device 1210), the electronic device 201 may display a selection popup 1818 for selecting an external electronic device to proceed with a registration procedure of an air conditioner based on recommended device information (e.g., the recommended device information of operation 1614) as shown in FIG. 18B. The selection popup 1818 may include one or more items corresponding to one or more external electronic devices (e.g., at least one of a TV, a refrigerator, or a hub) having discovered the air conditioner. When a user input 1820 (e.g., a touch) indicating registration by the TV is received through the selection popup 1818, the electronic device 201 may transmit a signal requesting to proceed with the registration procedure of the air conditioner to the TV through the server 1220 (e.g., the IoT server 1222). In response to the signal, the TV may obtain confirm data (e.g., the full serial number) of the air conditioner from the account server 1224 as in operations 1514 and 1516, and may transmit the connection information and spatial information of the TV to the air conditioner as in operation 1520.

An electronic device 201 according to an embodiment of the disclosure may include a communication module 290 and at least one processor 220 operatively connected to the communication module. The at least one processor may be configured to acquire identification information of a controlled device by performing a nearby device scan. The at least one processor may be configured to request confirm data of the controlled device corresponding to the identification information from the server through the communication module. The at least one processor may be configured to perform a first registration procedure including operations for registering the controlled device in the server through the communication module in case that the confirm data is not received from the server. The at least one processor may be configured to perform a second registration procedure including the remaining operations except for at least one operation for obtaining the confirm data from among operations included in the first registration procedure in case that the confirm data is received from the server.

The first registration procedure may include a first operation of obtaining the confirm data of the controlled device by scanning a quick response (QR) code, and a second operation of obtaining confirmation of the controlled device by using the confirm data. The second registration procedure may be configured not to include the first operation but to include a third operation of obtaining confirmation of the controlled device by using the confirm data received from the server.

The identification information may include a value for identifying the controlled device, obtained from a signal broadcast by the controlled device.

The identification information may include at least one of a media access control (MAC) address or a service set identifier (SSID) of the controlled device.

The confirm data may include a value that is not broadcast by the controlled device and identifies ownership of the controlled device.

The confirm data may include a serial number of the controlled device.

Each of the first registration procedure and the second registration procedure may include transmitting, to the controlled device, connection information used for the controlled device to connect to the server, receiving a message notifying that the controlled device has been registered from the server, and displaying a registration success screen notifying that registration of the controlled device has succeeded.

The at least one processor may be configured to display a removal device list including at least one previously removed controlled device, receive a user input for selecting a first controlled device through the removal device list, and in response to the user input, perform registration of the controlled device by using the second registration procedure.

The at least one processor is configured to request removal of the controlled device from the server, based on a user request or detection of a failure of the controlled device.

A method for operating an electronic device according to an embodiment of the disclosure may include acquiring identification information of the controlled device by performing a nearby device scan in operation 505. The method may include requesting confirm data of the controlled device corresponding to the identification information from the server in operation 510. The method may include performing a first registration procedure including operations for registering the controlled device in the server in case that the confirm data is not received from the server in operation 520. The method may include performing a second registration procedure including the remaining operations except for at least one operation for obtaining the confirm data from among operations included in the first registration procedure in case that the confirm data is received from the server in operation 540.

The first registration procedure may include a first operation of obtaining the confirm data of the controlled device by scanning a quick response (QR) code, and a second operation of obtaining confirmation of the controlled device by using the confirm data. The second registration procedure may be configured not to include the first operation but to include a third operation of obtaining confirmation of the controlled device by using the confirm data received from the server.

The identification information may include a value for identifying the controlled device, obtained from a signal broadcast by the controlled device.

The identification information may include at least one of a media access control (MAC) address or a service set identifier (SSID) of the controlled device.

The confirm data may include a value that is not broadcast by the controlled device and identifies ownership of the controlled device.

The confirm data may include a serial number of the controlled device.

Each of the first registration procedure and the second registration procedure may include transmitting, to the controlled device, connection information used for the controlled device to connect to the server, receiving a message notifying that the controlled device has been registered from the server, and displaying a registration success screen notifying that registration of the controlled device has succeeded.

The method may further include displaying a removal device list including at least one previously removed controlled device, receiving a user input for selecting a first controlled device through the removal device list, and performing registration of the controlled device by using the second registration procedure in response to the user input.

The method may further include requesting removal of the controlled device from the server, based on a user request or detection of a failure of the controlled device.

An electronic device 1210 according to an embodiment of the disclosure may include a communication interface 1320, and a processor 1310 operatively connected to the communication interface. The processor may be configured to perform registration in a server through the communication interface. The processor may be configured to obtain at least one of a partial serial number or device type information of an unregistered device from a signal broadcast from the unregistered device through a nearby device scan. The processor may be configured to obtain a full serial number of the unregistered device from the server based on at least one of the partial serial number or device type information. The processor may be configured to transmit connection information used for the unregistered device to connect to the server, and spatial information of the electronic device to the unregistered device.

The processor may be configured to transmit an inquiry signal to the server to inquire whether an auto-registration function for the unregistered device is enabled, and request the full serial number of the unregistered device from the server in case that a response signal indicating that the auto-registration function is enabled is received from the server.

The processor may be configured to transmit a search result including identification information of the electronic device and identification information of the unregistered device to the server in case that a response signal indicating that the auto-registration function is not enabled is received from the server.

A method for operating an electronic device 1210 according to an embodiment of the disclosure may include performing registration in a server through the communication interface in operation 1400. The method may include obtaining at least one of a partial serial number or device type information of the unregistered device from a signal broadcast from the unregistered device through a nearby device scan in operations 1405 and 1410. The method may include obtaining a full serial number of the unregistered device from the server based on at least one of the partial serial number or device type information in operation 1425. The method may include transmitting connection information used for the unregistered device to connect to the server, and spatial information of the electronic device to the unregistered device in operations 1535 and 1540.

The method may include transmitting an inquiry signal to the server to inquire whether an auto-registration function for the unregistered device is enabled in operation 1415, and receiving a response signal indicating that the auto-registration function is enabled from the server in operation 1420.

The method may include, in case that a response signal indicating that the auto-registration function is not enabled is received from the server in operation 1420, transmitting a search result indicating that the unregistered device has been discovered by the electronic device to the server in operation 1445.

The method may further include performing a discovery operation to discover the unregistered device.

The performing of the discovery operation may include broadcasting a discovery signal, The unregistered device may be discovered when a receive signal strength indicator (RSSI) of a signal transmitted from the unregistered device is greater than a threshold value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 240) including one or more instructions that are stored in a storage medium (e.g., internal memory 236 or external memory 238) that is readable by a machine (e.g., the electronic device 201). For example, a processor (e.g., the processor 220) of the machine (e.g., the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. An electronic device comprising:
   a display;
   communication circuitry;
   memory storing one or more computer programs; and one or more processors communicatively coupled to the communication circuitry and the memory,
wherein the one or more computer programs include computer-executable instructions that, when executed by the one or more processors individually or collectively, cause the electronic device to:
   acquire identification information of a controlled device by performing a nearby device scan,
   request confirm data of the controlled device corresponding to the identification information from a server through the communication circuitry,
   in case that the confirm data is not received from the server, perform a first registration procedure including operations for registering the controlled device in the server through the communication circuitry, and
   in case that the confirm data is received from the server, perform a second registration procedure including the remaining operations except for at least one operation for obtaining the confirm data from among operations included in the first registration procedure, wherein the at least one operation for obtaining the confirm data includes display, through the display, a screen configured to scan a verification indicia of the controlled device, wherein the second registration procedure is performed when a first request configured to re-registration for the controlled device is received through the electronic device, and wherein the confirm data is not broadcast by the controlled device and includes a full serial number of the controlled device.

2. The electronic device of claim 1,
wherein the first registration procedure comprises a first operation of obtaining the confirm data of the controlled device from machine-readable verification indicia and a second operation of obtaining confirmation of the controlled device by using the confirm data, and
wherein the second registration procedure does not include the first operation but includes a third operation of obtaining confirmation of the controlled device by using the confirm data received from the server.

3. The electronic device of claim 1, wherein the identification information comprises at least one of a media access control (MAC) address or a service set identifier (SSID) of the controlled device.

4. The electronic device of claim 1, wherein each of the first registration procedure and the second registration procedure comprises:
   transmitting, to the controlled device, connection information used for the controlled device to connect to the server;
   receiving a message notifying that the controlled device has been registered from the server; and
   outputting a registration success notification notifying that registration of the controlled device has succeeded.

5. The electronic device of claim 1, wherein the computer-executable instructions further cause the electronic device to:
   display a removal device list including at least one previously removed controlled device,
   receive a user input for selecting a first controlled device through the removal device list, and
   in response to the user input, perform registration of the controlled device by using the second registration procedure.

6. The electronic device of claim 1, wherein the computer-executable instructions further cause the electronic device to request removal of the controlled device from the server, based on a user request or detection of a failure of the controlled device.

7. A method for operating an electronic device, the method comprising:

acquiring identification information of a controlled device by performing a nearby device scan;

requesting confirm data of the controlled device corresponding to the identification information from a server;

performing a first registration procedure including operations for registering the controlled device in the server in case that the confirm data is not received from the server; and performing a second registration procedure including the remaining operations except for at least one operation for obtaining the confirm data from among operations included in the first registration procedure in case that the confirm data is received from the server, wherein the at least one operation for obtaining the confirm data includes display, through the display, a screen configured to scan a verification indicia of the controlled device, wherein the second registration procedure is performed when a first request configured to re-registration for the controlled device is received through the electronic device, and wherein the confirm data is not broadcast by the controlled device and includes a full serial number of the controlled device.

8. The method of claim 7, wherein the first registration procedure comprises a first operation of obtaining the confirm data of the controlled device from machine-readable verification indicia, and a second operation of obtaining confirmation of the controlled device by using the confirm data, and wherein the second registration procedure does not include the first operation but includes a third operation of obtaining confirmation of the controlled device by using the confirm data received from the server.

9. The method of claim 7, wherein the identification information comprises at least one of a media access control (MAC) address or a service set identifier (SSID) of the controlled device.

* * * * *